United States Patent
Abedi et al.

(10) Patent No.: US 9,736,884 B2
(45) Date of Patent: Aug. 15, 2017

(54) IMPROVEMENTS TO SHORT-RANGE WIRELESS NETWORKS

(75) Inventors: Saied Abedi, Reading (GB); Hind Chebbo, Cowley (GB)

(73) Assignee: FUJITSU LIMITED, Kawasaki (JP)

( * ) Notice: Subject to any disclaimer, the term of this patent is extended or adjusted under 35 U.S.C. 154(b) by 1347 days.

(21) Appl. No.: 13/254,088

(22) PCT Filed: Feb. 9, 2010

(86) PCT No.: PCT/EP2010/051591
§ 371 (c)(1),
(2), (4) Date: Nov. 14, 2011

(87) PCT Pub. No.: WO2010/100012
PCT Pub. Date: Sep. 10, 2010

(65) Prior Publication Data
US 2012/0057486 A1   Mar. 8, 2012

(30) Foreign Application Priority Data
Mar. 4, 2009 (EP) .................................... 09154363

(51) Int. Cl.
*H04W 84/18*   (2009.01)
*H04W 52/02*   (2009.01)

(52) U.S. Cl.
CPC ....... *H04W 84/18* (2013.01); *H04W 52/0216* (2013.01); *H04W 52/0219* (2013.01); *Y02B 60/50* (2013.01)

(58) Field of Classification Search
None
See application file for complete search history.

(56) References Cited

U.S. PATENT DOCUMENTS

| 8,208,391 | B2* | 6/2012 | Gurney | H04W 52/0229 370/252 |
| 8,583,768 | B2* | 11/2013 | Han | H04W 52/0225 709/220 |

(Continued)

FOREIGN PATENT DOCUMENTS

| CN | 101282335 A | 10/2008 |
| EP | 1 473 870 | 11/2004 |

(Continued)

OTHER PUBLICATIONS

Taiwanese Office Action dated Mar. 28, 2013 in corresponding Taiwanese Application No. 099102812.

(Continued)

*Primary Examiner* — Chirag Shah
*Assistant Examiner* — Amar Persaud
(74) *Attorney, Agent, or Firm* — Staas & Halsey LLP

(57) ABSTRACT

A wireless sensor network of devices including a sensor and a coordinator:
the sensor comprising sensing means operable to detect values of a parameter; transmission and reception means for wireless communication with other devices in the network; and sensor control means operable to control a sleep pattern of the sensor; and
the coordinator comprising transmission and reception means for wireless communication with other devices in the network; wherein
the sensor transmission means is operable to transmit value information as to the parameter values and the coordinator transmission means is operable to transmit an indication of a suitable sensor sleep pattern taking into account the value information.

14 Claims, 23 Drawing Sheets

(56) References Cited

U.S. PATENT DOCUMENTS

| | | | |
|---|---|---|---|
| 2001/0030468 A1* | 10/2001 | Anderson | H02J 3/14 307/31 |
| 2006/0031378 A1 | 2/2006 | Vallapureddy et al. | |
| 2006/0092907 A1* | 5/2006 | Shimokawa et al. | 370/347 |
| 2007/0014268 A1* | 1/2007 | Kim | H04W 74/0816 370/338 |
| 2007/0027367 A1* | 2/2007 | Oliver | A61B 5/0002 600/300 |
| 2008/0025341 A1* | 1/2008 | Rao | H04W 72/048 370/468 |
| 2008/0094204 A1* | 4/2008 | Kogan | G08B 25/003 340/506 |
| 2008/0194925 A1* | 8/2008 | Alsafadi | A61B 5/0002 600/301 |
| 2008/0291855 A1 | 11/2008 | Bata et al. | |
| 2009/0185548 A1* | 7/2009 | Pratapagiri | A61B 5/0002 370/346 |
| 2009/0322592 A1 | 12/2009 | Kai | |
| 2010/0067421 A1* | 3/2010 | Gorokhov | H04W 52/0206 370/311 |
| 2012/0109340 A1* | 5/2012 | Vezza | G01D 21/00 700/22 |
| 2013/0003561 A1* | 1/2013 | Wesby | 370/241 |
| 2013/0102275 A1* | 4/2013 | Morris | H04B 17/318 455/405 |
| 2014/0071859 A1* | 3/2014 | Lee | H04J 3/06 370/277 |
| 2016/0174907 A1* | 6/2016 | Colman | A61B 5/082 600/301 |

FOREIGN PATENT DOCUMENTS

| | | |
|---|---|---|
| EP | 1473870 A2 | 11/2004 |
| JP | 5-316120 | 11/1993 |
| JP | 2003-272079 | 9/2003 |
| JP | 2004-272506 | 9/2004 |
| JP | 2006-186891 | 7/2006 |
| JP | 2007-74691 | 3/2007 |
| JP | 2008-278308 | 11/2008 |
| WO | 2006/038163 A1 | 4/2006 |
| WO | 2007/083586 | 7/2007 |

OTHER PUBLICATIONS

Thafer H. Sulaiman, et al, Improved PNC Selection Criteria and Process for IEEE 802.15.3, IEEE Communications Magazine, Dec. 2007, pp. 102-109.
IEEE 802.15.4-2006 Standard, Sep. 8, 2003.
IEEE 802.15.3-2003 Standard, Sep. 29, 2003.
IEEE 802.15.6 Standard, Jun. 2011.
European Search Report issued Oct. 6, 2009 in European Application No. 09154363.7-1249.
International Search Report issued May 3, 2010 in PCT/EP2010/051591.
European Office Action mailed Feb. 12, 2013 for corresponding European Application No. 09154363.7.
Chinese Office Action mailed Aug. 5, 2013 in corresponding Chinese Application No. 201080011124.X.
Japanese Office Action mailed Sep. 17, 2013 in corresponding Japanese Application No. 2011-552376.

* cited by examiner

| Battery charge level | Battery status bits |
|---|---|
| 0% - 25% | 00 |
| 25% - 50% | 01 |
| 50% - 75% | 10 |
| 75% - 100% | 11 |

| Battery | | Sleep Pattern | | | |
|---|---|---|---|---|---|
| bits:b1b2 | Levels | Low Wakeup | Medium Wakeup | High Wakeup | Continuous Wakeup |
| 00 | L1=0%-25% | ✓ | ✗ | ✗ | ✗ |
| 01 | L2=25%-50% | ✓ | ✓ | ✗ | ✗ |
| 10 | L3=50%-75% | ✓ | ✓ | ✓ | ✗ |
| 11 | L4=75%-100% | ✓ | ✓ | ✓ | ✓ |

FIG. 18

| Bits:0-2 | 3 | 4 | 5 | 6 | 7-9 | 10-11 | 12-13 | 14-15 | Extended bit:0 | Extended bits:1 |
|---|---|---|---|---|---|---|---|---|---|---|
| Frame Type | Security Enabled | Frame Pending | ACK Request | PAN ID Compression | Reserved | Destination Addressing Mode | Frame Version | Source Addressing Mode | Urgent1 | Urgent2 |

FIG. 23

| Bits:0-2 | 3 | 4 | 5 | 6 | 7-9 | 10-11 | 12-13 | 14-15 | Extended bit:0 | Extended bits:1 | Extended bit:2 | Extended bits:3 |
|---|---|---|---|---|---|---|---|---|---|---|---|---|
| Frame Type | Security Enabled | Frame Pending | ACK Request | PAN ID Compression | Reserved | Destination Addressing Mode | Frame Version | Source Addressing Mode | Urgent1 | Urgent2 | Battery Level 1 | Battery Level 2 |

| Bits:0-2 | 3 | 4 | 5 | 6 | 7 | 8-9 | 10-11 | 12-13 | 14-15 | Extended bit:0 | Extended bits:1 | Extended bit:2 | Extended bits:3 |
|---|---|---|---|---|---|---|---|---|---|---|---|---|---|
| Frame Type | Security Enabled | Frame Pending | ACK Request | PAN ID Compression | Emergency | ACK Types | Destination Addressing Mode | Frame Version | Source Addressing Mode | Urgent 1 | Urgent 2 | Battery Level 1 | Battery Level 2 |

FIG. 26

| Frame Type Value b2 b1 b0 | Description |
|---|---|
| 000 | Beacon frame |
| 001 | Data frame |
| 010 | ACK |
| 011 | MAC command |
| 100 | Immediate Ack |
| 101- | Delayed Ack |
| 111 | Emergency |

FIG. 27

| Frame header | | | | | |
|---|---|---|---|---|---|
| Frame control | | | | | |
| Frame Type (3bits) | ACK Policy (two bits) | Emergency (1 bit) | Urgency levels (two bits) | Battery Levels (two bits) | ..... |

FIG. 28

| Frame Type Value (3bits) | Description |
|---|---|
| 000 | Beacon frame |
| 001 | Data frame |
| 010 | ACK |
| 011 | MAC command |
| 100 | Immediate Ack |
| 101- | Delayed Ack |
| 111 | Emergency |

| Octets | 1 | (see 7.2.2.4.1) | 0/5/6/10/14 | 1 | Variable | 2 |
|---|---|---|---|---|---|---|
| Frame control | Sequence Number | Addressing fields | Auxiliary Security Header | Command Frame Identifier | Command Payload | FCS |
| MHR | | | | MAC Payload | | MFR |

FIG. 29

| Command frame identifier | Command name | RFD Tx | RFD Rx | Subclause |
|---|---|---|---|---|
| 0x01 | Association request | X | | 7.3.1 |
| 0x02 | Association response | | X | 7.3.2 |
| 0x03 | Disassociation notification | X | X | 7.3.3 |
| 0x04 | Data request | X | | 7.3.4 |
| 0x05 | PAN ID conflict notification | X | | 7.3.5 |
| 0x06 | Orphan notification | X | | 7.3.6 |
| 0x07 | Beacon request | | | 7.3.7 |
| 0x08 | Coordinator realignment | | X | 7.3.8 |
| 0x09 | GTS request | | | 7.3.9 |
| 0x0a-0xff | Reserved | | | - |

FIG. 30

IMPROVEMENTS TO SHORT-RANGE WIRELESS NETWORKS

CROSS REFERENCE TO RELATED APPLICATIONS

This application is a national phase application, under 35 U.S.C. 371, of international application No. PCT/EP2010/051591, filed on Feb. 9, 2010, which claimed priority to European Patent Application No. 09154363.7, filed on Mar. 4, 2009, the disclosures of which are incorporated herein by reference.

The present invention relates to wireless personal area networks and particularly, but not necessarily exclusively, to wireless sensor networks and to body area networks including wirelessly-communicating sensors disposed on or around a human or animal body.

The so-called Body Area Network or BAN is an example of wireless personal area networks (WPANs), used to convey information over relatively short distances.

Unlike wireless local area networks (WPANs), connections effected via WPANs involve little or no infrastructure. This feature allows small, power-efficient, inexpensive solutions to be implemented for a wide range of devices. Of particular interest is the possibility of the medical BAN (MBAN) in which sensors are used to monitor the status of a patient. A BAN employing mainly sensors for feeding sensed data to a data sink (which may also be a network co-ordinator) is an example of a wireless sensor network (WSN); however, more active devices, such as actuators, may be also be included in a WSN acting as an MBAN.

Another interesting use of short-range wireless networks is in industrial monitoring. Such wireless networks may be designed to include sensors and other devices. For example, one deployment would include sensors arranged to measure a parameter such as temperature at various different positions on a turbine blade or other industrial part for monitoring. Again, more active devices can be included in such a wireless network and little or no infrastructure is required.

Standard IEEE 802.15.4 defines the physical layer (PHY) and medium access control (MAC) sublayer specifications for low data-rate WPANs, although the coverage of an IEEE 802.15.4 network may extend beyond a personal operating space (POS) which typically defines the WPAN and is thus also suitable for somewhat larger-scale industrial deployment. Such slightly larger-scale networks are included within the terms WSN, WPAN and BAN for the purposes of this application. IEEE 802.15.4 has some similarities with a standard for an ad-hoc piconet, IEEE 802.15.3. Such piconets around a person or object typically cover at least 10 m in all directions and envelop the person or object, whether stationary or in motion. They include higher data-rate WPANs. The documents IEEE Std 802.15.4-2006 and IEEE Std 802.15.3-2003 are hereby incorporated by reference in their entirety.

WPANs of the type envisaged in IEEE 802.15.4 are suitable for applications such as industrial monitoring, but do not offer the kind of data reliability required for MBANs.

In medical applications, there is a requirement to reduce the costs associated with human labour while increasing the reliability and process automation and reducing human error. Sensors can provide the required intelligence, and already are widely employed in medical equipment. This includes hospital recuperative care, home care, intensive care units and advanced surgical procedures. There are many different types of sensors employed for medical applications, including external sensors for pulse, temperature etc., sensors which come in contact with body fluids, sensors used in catheters (through incision), sensors for external applications, disposable skin patches with wireless sensors, and implantable sensors.

A WPAN of sensors around a patient in a hospital or medical ward could provide multiple clinical benefits including patient mobility, monitoring flexibility, extension of monitoring into care areas that are currently unmonitored, reduced clinical errors and reduced overall monitoring costs. Body worn sensors may include various sensor types on single patient body. They require a capability to be applied or removed quickly from the patient's body.

On an individual basis, such sensors may have bit rates of as low as 1-2 kbps per patient and on an aggregate basis they may require a 10 kbps bit rate. A range of as little as 1 meter may be adequate. However, medical WSN applications are mission critical applications in the clinical environment. Robust wireless links for bounded data loss and bounded latency, capacity for patient and sensor density, coexistence with other radios, battery life for days of continuous operations and small form factors for body worn devices, are among the requirements for medical WSNs or MBANs. These requirements can be satisfied through utilization of techniques such as diversity and error control techniques in the time and frequency domain, including Forward Error Correction (FEC) and Adaptive Repeat reQuest (ARQ), low duty cycle TDMA for sensor information rate, and more efficient small antennas. Efforts are therefore in progress to define a further standard IEEE802.15.6 which aims to define the properties of Body Area Networks, particularly for medical applications.

One of the key requirements of IEEE 802.15.3, IEEE 802.15.4, IEEE802.15.6 and other standards related to wireless networks including sensors, in which at least some of the devices are powered by batteries, is conserving battery life. This is especially important for emergency situations in which the life of the patient depends on the reliability of wireless links in medical WSN applications, or for monitoring mission critical industrial environments, such power stations. Battery-powered devices usually require duty cycling to reduce power consumption. Duty-cycling devices have a sleep pattern, spending much of their operational life in a sleep state. Such devices "wake up" periodically to transmit or receive.

The Sleep/wake up pattern (referred to as sleep pattern in the following) is periodic and determines the length of time for which a device is awake during each period of time. During wake up time, the device, for example a sensor, sends the measurements or other data it has already gathered. If the sensor finishes sending the measurement before the end of the wake up time, it goes back to sleep and follows the sleep pattern already set for it. If the sensor did not finish data transmission before the end of wake up time, it can continue the transmission of the measurement and then go back to sleep according to the sleep pattern. Thus, there is a distinction between the sampling rate of measurement at the sensor and the transmission rate of measurement (duty cycle). For example there may be a scenario under which the measurement itself is very slow (e.g. large information gathered in a measurement attempt) and requires many transmission attempts to send the information on a piece-by-piece basis.

We may assume a period or a random pattern for measurements. The measurements arrive faster with a more aggressive transmission of the (faster) wake-up pattern. The primary reason to change the sleep pattern is to have more up-to-date and fresher information as to the life parameters (i.e. faster measurements). The nature of the medical or other critical application would decide how fast the sleep pattern is. For example, for cardiac applications it depends on the live entity we deal with. For humans the pattern is slower than for animals (say in extreme cases quarter of a second for human and tenth of second for a mouse).

There is a need to address the issue of conserving battery life using sleep patterns while making sure that the sensor data is sent to the co-ordinator of the network in a timely and reliable manner.

According to embodiments of the first aspect of the present invention, there is provided a wireless sensor network of devices including a sensor and a coordinator:

the sensor comprising sensing means operable to detect values of a parameter; transmission and reception means for wireless communication with other devices in the network; and sensor control means operable to control a sleep pattern of the sensor; and the coordinator comprising transmission and reception means for wireless communication with other devices in the network; wherein the sensor transmission means is operable to transmit value information as to the parameter values and the coordinator transmission means is operable to transmit an indication of a suitable sensor sleep pattern taking into account the value information.

The network of invention embodiments allows a coordinator to transmit suitable sleep patterns, so that centralised control of or at least influence on sleep patterns is provided. The sensor in the network detects values of a parameter and transmits information relating to these values directly or indirectly via other devices to the coordinator. This value information is used to determine an indication of a suitable sensor sleep pattern, which is then transmitted by the coordinator indirectly or directly to the sensor concerned. The term "operable" used herein thus includes the idea of the means defined being arranged to carry out the function specified in use. The skilled reader will appreciate that the indication may be provided and transmitted with other information. For example separate information as to an emergency status (perhaps in the form of an emergency bit) may be provided.

In some embodiments the described sensor may be the only duty-cycling device in the wireless sensor network. More commonly, the sensor may be one of a plurality on duty-cycling devices in the network, the coordinator being operable to transmit suitable sleep patterns for each of the duty-cycling devices. The devices can be sensors, actuators or any other type of battery powered device used in the network. Thus the coordinator influences the operation of each duty-cycling device by providing an indication of a suitable sleep pattern. Such central coordination allows flexible and enhanced network operation.

In one scenario, the suitable sleep pattern transmitted to at least one of the duty-cycling devices takes into account an external factor, that is a factor not related to that device. For example, at least one duty-cycling device in the network may receive a suitable sleep pattern which has been determined taking into account values detected by the sensor described previously. In this case, the parameter values can indicate an emergency state and centralised control of the suitable sleep pattern allocation can allow lower duty-cycle sleep patterns to be sent to other devices in the network, thus ensuring that sufficient network resources are available for the sensor in the emergency state. Of course, the emergency state could be defined in other ways, depending on the functionality of the device concerned. For example an actuator may be in an emergency state if it is instructed to operate at a high level, this emergency state then being used in the centralised control of suitable sleep patterns to influence other devices in the network.

In a network as defined above, different devices may have different priorities. For example, there may be a differentiation between critical medical device (high priority), medical devices (middle priority) and non-medical devices (low priority). Such priorities can be used to allocate network resources. Advantageously, the allocation of the priority to each duty-cycling device can determine to what extent, if at all, the coordinator takes external factors (for example those relating to other devices in the network) into account to determine its suitable sleep pattern. As an example, a sensor may be categorised as a critical medical device and thus there may be no external influences on the suitable sleep patterns sent to this sensor. Low priority duty-cycling devices may have their sleep pattern reduced to lower duty-cycling as a result of an external factor based one or more higher priority duty-cycling devices in the network having an increased requirement for network resource, such as an emergency state. The skilled reader will appreciate that there may be one or more than one emergency state predefined for duty-cycling devices, each higher emergency state having a more severe effect on the suitable sleep pattern transmitted to one or more other duty-cycling device in the network.

The suitable sleep pattern may be determined in any suitable way, such as by an algorithm, by a simple calculation, use of a look-up table or by human intervention. In one preferred embodiment, the coordinator includes determining means which are used to determine the suitable sleep pattern. Alternatively, the coordinator can receive the suitable sleep pattern from a central monitoring unit, which is in wired or wireless connection with the coordinator. Thus, the central monitoring unit can be part of the wireless sensor network or not, depending on the WSN deployment.

A central monitoring unit (also sometimes referred to as a central monitoring and medical care unit, in medical applications) can be a station with monitoring equipment capable of receiving continuous or occasional streams of emergency data from multiple stations (for example for multiple patients). The central monitoring unit may include operatives (such as nurses or medical specialists) whose role is to monitor the data received. These operatives can take action in response to changes in conditions, for example, in individual patients or industrial parts.

Once a suitable sleep pattern is determined in the coordinator or in the central monitoring unit, it is transmitted wirelessly to the sensor where it is received using the sensor reception means. As noted above, the transmission may be direct, or indirect via other network nodes. The skilled reader will appreciate that the transmission of the information as to the parameter values from the sensor to the coordinator can also be either direct or indirect.

The information as to the parameter values can be transmitted in any suitable fashion, possibly within a data frame. The information may in fact comprise the actual parameter values, or the parameter values may be processed in some way by a sensor processing means to produce the information.

The indication of a suitable sensor sleep pattern transmitted from the coordinator can also be provided in any suitable manner. Preferably, when the WSN uses transmission frames, the indication is transmitted in a control field of a transmission frame, for example using a value set in the MAC header, such as in the frame control field to a predetermined value. In one preferred embodiment, the value can be one or more bits acting in combination to designate a suitable predefined sleep pattern. The value could be in the frame control field of any transmission frame. Alternatively, the value could be a device state description (maybe a full octet, including the indication and potentially other information such as a warning/emergency status) in a MAC frame. In this case the MAC frame control could include a device state bit to indicate whether the device state description should be read and interpreted.

In preferred embodiments, transmission of the indication takes priority over other transmissions from the coordinator. For example, transmissions including the indication can be scheduled before transmissions not including the indication. Alternatively, the indication can be sent in all transmission frames sent from the coordinator permanently, or over a particular time period.

Preferably the network devices use acknowledgement functionality to allow for an acknowledgement of the indication and/or value information. The acknowledgement can be linked to a re-send if there is a failure.

The detected values may be taken into account (for example in the coordinator or central monitoring unit) to determine a suitable sleep pattern by comparison against one or more thresholds, by detection of a change in the parameter or by detection of a rate of change or in any other suitable way for the parameter being measured. In many situations, a simple comparison against one or more thresholds is appropriate.

The suitable sleep pattern can be defined in real time. For example one or more different thresholds, different values or different changes and rates of change can be used to calculate a suitable sleep pattern in terms of percentage wake-up time, time between transmissions or any other suitable definition. In other cases, predefined sleep patterns can be stored, preferably in the network, for example in the sensor and/or coordinator and/or central monitoring unit.

In preferred embodiments there is a plurality of predefined sleep patterns determined by the number of thresholds, each threshold defining a boundary between a lower wake-up and a higher wake-up sleep pattern. Here, a lower wake-up sleep pattern may indicate a lower duty cycle or longer time between transmissions and a higher wake-up sleep pattern can indicate a higher duty cycle or shorter time between transmissions.

Where a battery (which is taken to mean any means of powering the sensor which is depletable and thus requires replacement and/or recharging) is present to power the sensor, it can be advantageous to adjust the sleep pattern to reflect this. Otherwise, the control means can simply implement the sleep pattern which has been determined as suitable taking the detected values into account and transmitted to the sensor.

Preferably a sensor as described above further comprises a battery, wherein the control means are operable to control the sleep pattern taking into account both the indication and a current battery charge of the sensor. For example, the actual sleep pattern may be selected based on a combination of these factors and potentially other factors.

Thus for example, the control means may allow or reject suitable sleep patterns according to a predefined limit of acceptable battery charge. The control means can be designed to override any rejected suitable sleep pattern with a lower wake-up sleep pattern. Preferably, the lower wake-up pattern is the predefined sleep pattern with the maximum wake-up pattern allowed by the battery.

If there is more than one limit between different levels of battery charge, the control means allowing fewer sleep patterns below each limit than above it, then preferably the number of limits is equal to the number of thresholds.

Advantageously, the sensor transmitter is additionally operable to transmit information relating to the current battery charge, preferably in a control field of a transmission frame, as for the indication. Transmission frames used by the wireless sensor network can comprise both a control field for the indication and a control field for the current battery charge, each in the form of one or more bits. Alternatively, the same control field can be used for the battery charge information and the indication, transmission frames transmitted from the sensor towards the coordinator including the battery charge information in this control field and transmission frames transmitted from the coordinator towards the sensor including the indication in this control field.

The coordinator reception means may be operable to receive the battery charge information and the coordinator can further comprise response means operable to respond to a predefined value of charging information by taking action with respect to the battery. For example, the coordinator may set a battery change alarm, in form the central monitoring unit of the situation or take any other appropriate action.

In a further aspect, the invention embodiments provide a coordinator in a wireless sensor network of devices including a sensor and the coordinator, wherein the coordinator comprises reception means operable to receive value information from the sensor as to the detected values of a parameter;

determining means operable to determine a suitable sleep pattern for the sensor taking into account the value information; and transmission means operable to transmit an indication of the suitable sleep pattern.

In a yet further aspect, invention embodiments provide a sensor in a wireless sensor network of devices including the sensor and a coordinator, the sensor comprising:

sensing means operable to detect values of a parameter;

sensor control means operable to control a sleep pattern of the sensor;

transmission means operable to transmit value information as to the parameter values; and reception means operable to receive an indication of a suitable sensor sleep pattern determined taking into account the value information; wherein the sensor control means control the sleep pattern of the sensor taking the suitable sensor sleep pattern into account.

In a still further aspect, invention embodiments provide a central monitoring unit, which in use is in wired or wireless communication with a wireless sensor network of devices including a sensor and a coordinator:

the sensor comprising sensing means operable to detect values of a parameter; transmission and reception means for wireless communication with other devices in the network; and sensor control means operable to control a sleep pattern of the sensor; and the coordinator comprising transmission and reception means for wireless communication with other devices in the network; wherein the sensor transmission means is operable to transmit value information as to the parameter values and the coordinator transmission means is operable to transmit an indication of a suitable sensor sleep pattern taking into account the value information; the central monitoring unit comprising:

determining means operable to determine a suitable sleep pattern for the sensor taking the value information into account and communication means operable to send an indication of the suitable sleep pattern to a device of the network.

According to one method aspect, embodiments of the invention relate to a method in a wireless sensor network of devices including a sensor and a coordinator, the method comprising detecting values of a parameter in the sensor, transmitting value information as to the parameter values from the sensor towards the coordinator, transmitting an indication of a suitable sensor sleep pattern taking into account the value information from the coordinator towards the sensor and controlling a sleep pattern of the sensor taking into account the indication.

Further aspects of the present invention provide software (or a computer program) which, when executed by a processor of a sensor or a coordinator of a wireless sensor network or a control monitoring unit provides functionality of the above sensor or coordinator or control monitoring unit respectively and software which, when executed by a sensor or coordinator, carries out the methods described for these devices. Such software may be stored on a computer-readable medium.

Many features are described above with respect to one aspect only, to avoid repetition. However, features and preferred features of any of these aspects are freely combinable and applicable to other aspects as appropriate. In particular, the reader will appreciate that where transmission and reception means are defined, corresponding reception and transmission means respectively are provided at the opposite end of the signal path.

For a better understanding of the present invention, and to show more clearly how it may be carried into effect, reference will now be made, by way of example only, to the following drawings in which:

FIG. 15 is a table demonstrating an example of battery bits that can be used in a control field of a transmission frame to denote battery charge level;

FIG. 18 is a table demonstrating one way of associating predefined sleep patterns to levels of battery charge;

FIG. 23 illustrates a modification to the IEEE 802.15.4 frame format;

FIG. 24 illustrates another modification to the IEEE 802.15.4 frame format;

FIG. 25 shows the required modifications to IEEE 802.15.4 frame control fields to include the urgency bits and battery bits, as well as other enhancements;

FIG. 26 shows the corresponding IEEE 802.15.4 modified frame type;

FIG. 27 illustrates all the enhancements as part of a new standard such as IEEE 802.15.6;

FIG. 28 shows a table corresponding to FIG. 27 of possible frame type bits;

FIG. 29 illustrates the basic format of a MAC frame in the current IEEE 802.15.4 standard; and FIG. 30 illustrates the Command Frame Identifier list of the current version of IEEE 802.15.4 standard.

Before explaining the embodiments of the present invention, some background explanation will be given of those parts of IEEE 802.15.4 which are expected to have relevance for the design of wireless networks (such as piconets, WPANs and BANs, including MBANs) having devices having a variable sleep pattern and/or could be used as a basis for the IEEE 802.15.6 standard currently under development.

Figure 1:
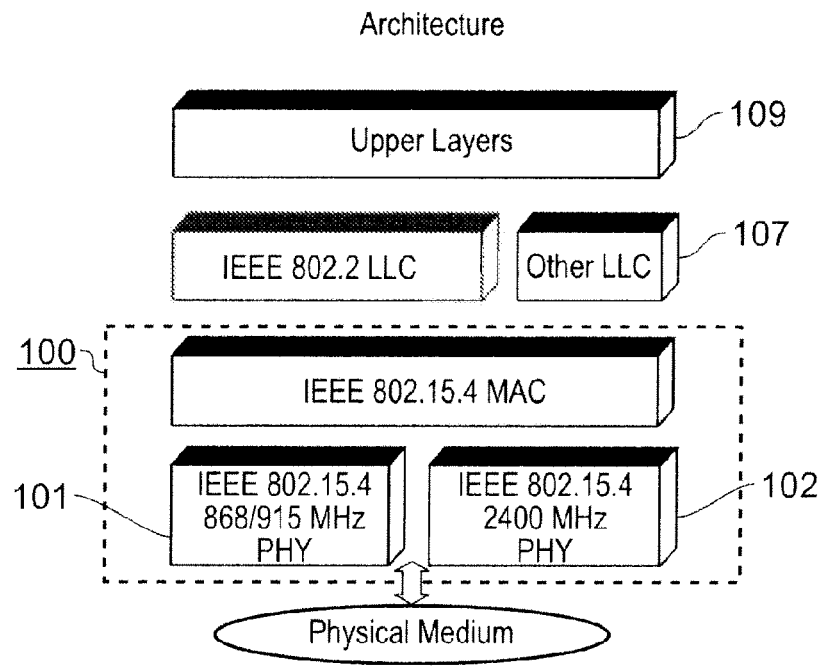
FIG. 1 illustrates protocol layers in an IEEE 802.15.4 WPAN.
Figure 2:
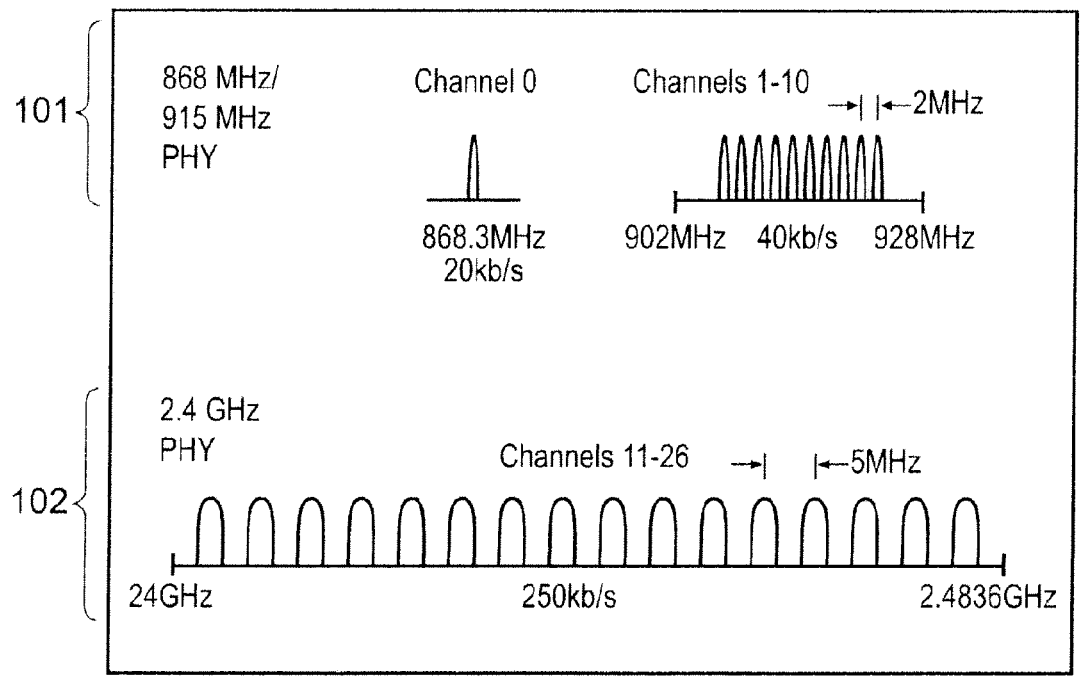
FIG. 2 illustrates possible PHY bands of the IEEE 802.15.4 WPAN.

FIG. 1 shows the general architecture of a IEEE 802.15.4 WPAN, labelled 100, in terms of the layered OSI model, in which the physical medium is accessed via a PHY layer containing the radio transceiver and its low-level control. As shown, there are two alternative frequency bands 101, 102 for the PHY, which are illustrated in FIG. 2. The lower frequency band 101 provides a single 20 kb/s channel centred on 868.3 MHz, and/or ten channels each of 40 kb/s centred on 915 MHz. The higher frequency band 102 provides 16 channels each of 250 kb/s and centred on a frequency of 2.44 GHz. Which of these bands is used will depend on local regulatory requirements.

Access to the PHY is provided by a MAC (Medium Access Control) sublayer indicated by 105 in FIG. 1. Above this, and external to the WPAN 100 as such, are provided a LLC (Link Layer Control) allowing access to the WPAN from other networks; this may be in accordance with the IEEE 802.2 standard, or of another type. Finally, upper layers 109 above the LLC include a network layer to provide network configuration, manipulation, and message routing, and an application layer which provides the intended overall function.

Figure 3:
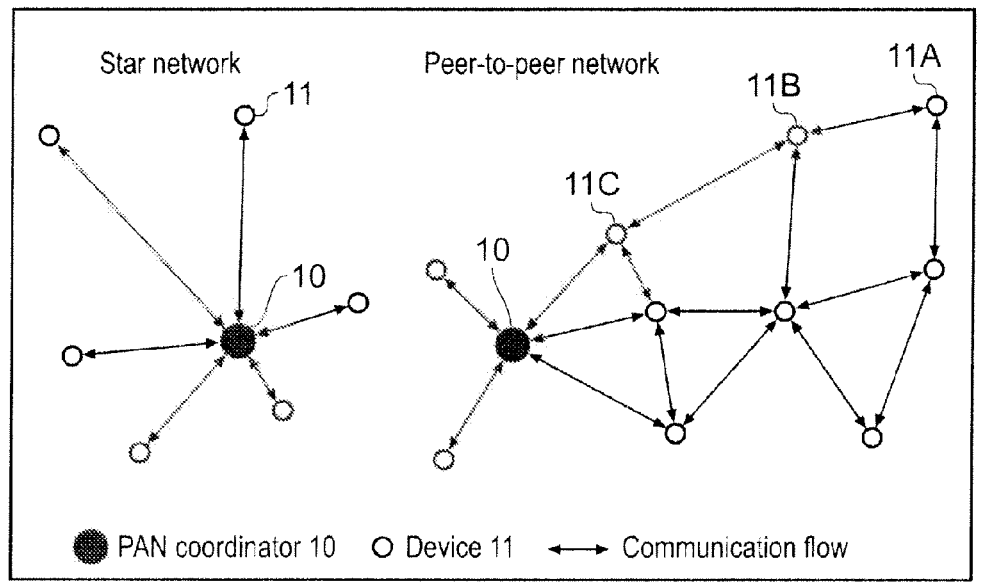
FIG. 3 illustrates Star and Peer-to-Peer topologies of a WPAN.

One task of the MAC sublayer is to control the network topology. Star and peer-to-peer are two known topologies in communications networks, and both are provided for in IEEE 802.15.4. In both cases, the topology distinguishes between two basic kinds of network node: devices and coordinators. As shown in FIG. 3, in the Star topology a number of devices 11 communicate directly with a central co-ordinator 10; whilst in the peer-to-peer configuration, communications by a device 11A with the communicator are made along one or more hops with intermediate devices 11B and 11C acting as relays. The coordinator acts as the access point to the upper layers; in the case of a WSN, it acts as the sink for the data collected by the sensors. Given that the communication range of each device may be very limited (a few meters), the peer-to-peer topology allows a greater area to be covered. The topology may be dynamic, changing as devices are added or leave the network.

In the case of industrial WSNs, for example, a star network might be appropriate to monitor readings from sensor on a single stationary item of machinery with moving parts. A peer-to-peer topology, on the other hand, could be used to monitor objects on a conveyer belt.

In the case of MBANs, for example, a star network would be appropriate in the case where a coordinator is provided at each patient site (such as a hospital bed), exchanging signals with devices on a single patient. Peer-to-peer would be a more appropriate topology where one coordinator was provided to serve a number of patients (the coordinator might be located at a fixed point in a hospital ward). Thus, whilst the devices 11 will generally be mobile the coordinator may be either mobile or fixed. Peer-to-peer networks may also be more suited to fast-changing environments where it is required to set up or change the network quickly, or to allow self-organisation and self-healing of the network. Self-healing may include, for example, establishing a new coordinator in the event that an existing coordinator has failed or left the network.

Multiple star and/or peer-to-peer networks may be set up in the same location such as a hospital or factory, each with their own coordinator. In this case it will be necessary for the respective coordinators to collaborate in order to avoid mutual interference and to allow sharing or collation of data. In IEEE 802.15.4 such networks are called clusters, and provision is made for establishing an overall coordinator for the clusters as well as for dividing and merging clusters.

Nodes in a WPAN may be constituted by units of varying capabilities. Generally, the role of coordinator will require a relatively capable apparatus with some processing power and transceiver capable of handling transmissions from multiple sources simultaneously. This in turn will necessitate a sufficient provision of electrical power (in some cases, it may be mains powered). On the other hand, other devices in the network may have more limited processing ability and access only to battery power, and may even be so simple as to be unable to act as a relay hop. Devices with very low power availability may be shut down most of the time and only "wake up" occasionally, for example to transmit sensor data to another node. Thus, the IEEE 802.15.4 standard distinguishes between "full-function" and "reduced function" devices. Availability of power is a particular issue for MBANs and other WPANs in which sensors may be implanted within a body or device and thus unable to have a large or rechargeable battery.

Two types of WPAN envisaged in IEEE 802.15.4 are beacon-enabled and non beacon-enabled.

Figure 4:
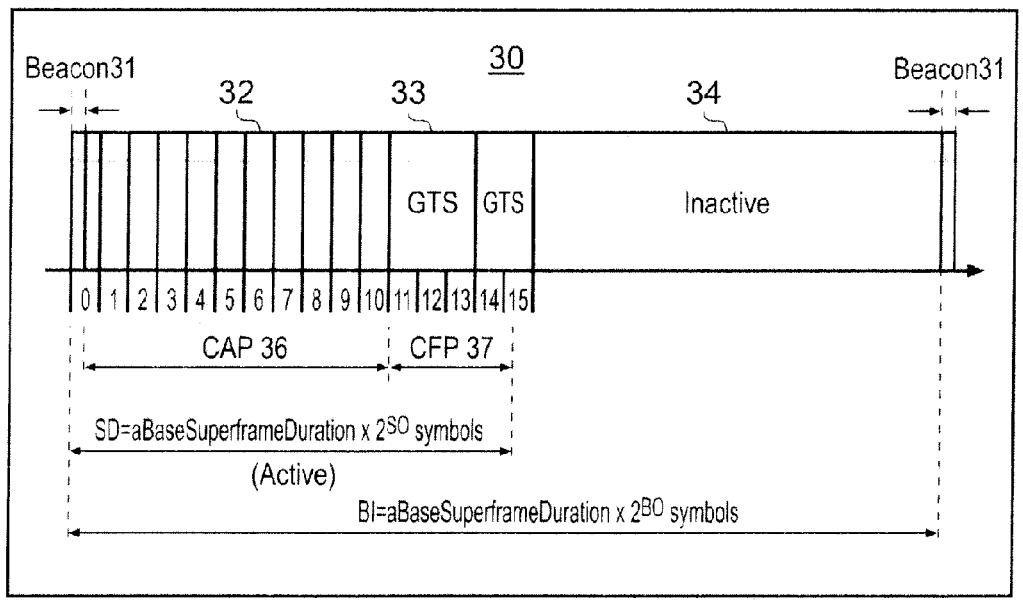
FIG. 4 shows the structure of a superframe in a beacon-enabled IEEE 802.15.4 WPAN.

In a beacon enabled network, the coordinator transmits a beacon periodically and devices listen periodically to that beacon to synchronize to the network and to access the channel. The channel access follows a superframe structure as shown in FIG. 4, which is defined by the coordinator. Each superframe 30 consists of two parts: active and inactive. The active part is divided into a contention access period CAP 36, followed by an optional contention free period CFP 37 for guaranteed access for applications with quality of service requirement.

As indicated by the vertical divisions in FIG. 4, the superframe is divided into 16 equally-spaced time slots each capable of carrying a frame of data from the coordinator or from a device. First comes a slot 31 for a beacon frame (see below) transmitted by the coordinator. After this, several slots 32 are provided within the CAP, allowing data transmission to or from devices on a contended basis, following the known CSMA-CA algorithm. Briefly, in CSMA-CA, each time a device wishes to transmit within the CAP, it waits for a random period. If the channel is found to be idle, following the random backoff, the device transmits its data. If the channel is found to be busy following the random backoff, the device waits for another random period before trying to access the channel again.

Next there follow the guaranteed time slots GTS 33 of the CFP, and as shown, each of these may extend over more than one basic time slot. After the expiry of the inactive period, the next superframe is marked by the coordinator sending another beacon frame 31. Devices can go to sleep during the inactive period 34 of the superframe. Thus, by extending the length of the inactive period 34, battery power of devices can be conserved as much as possible.

In the non beacon enabled network, the coordinator is not required to transmit a beacon for synchronization unless it is requested to do so (e.g. for network discovery purposes). The channel access is not restricted by the superframe structure and devices are asynchronous, performing all data transfers by CSMA-CA. They can follow their own sleeping pattern (or duty cycle) according to a certain protocol such as sensor—MAC.

For an MBAN application, the coordinator is external to the body or bodies being monitored. It may be a PDA, a mobile phone, a bedside monitor station or even a sufficiently-capable sensor which on a temporary basis acts as a coordinator. In an industrial WSN, the coordinator may be a PDA, a sensor, a laptop or other computer, or even a central or regional processor. As mentioned above, the coordinator in the beacon enabled network is in charge of providing synchronization and channel access to network devices. The start and end of a superframe is also defined by a coordinator. The coordinator has two main features of potential communications to other networks and access to a sufficient power supply, for example by easy replacement of the charged batteries.

FIGS. 5 to 8 illustrate data transfers between a device and a coordinator in a IEEE 802.15.4 network. Three basic types of transfer are defined in IEEE 802.15.4:

(i) data transfer to a coordinator as recipient to which a device (sender) transmits its data—used in both star and peer-to-peer topologies;

(ii) data transfer from a coordinator as sender in which the device receives the data—used in both star and peer-to-peer topologies; and (iii) data transfer between two peers—used in peer-to-peer networks only.

Figure 5:
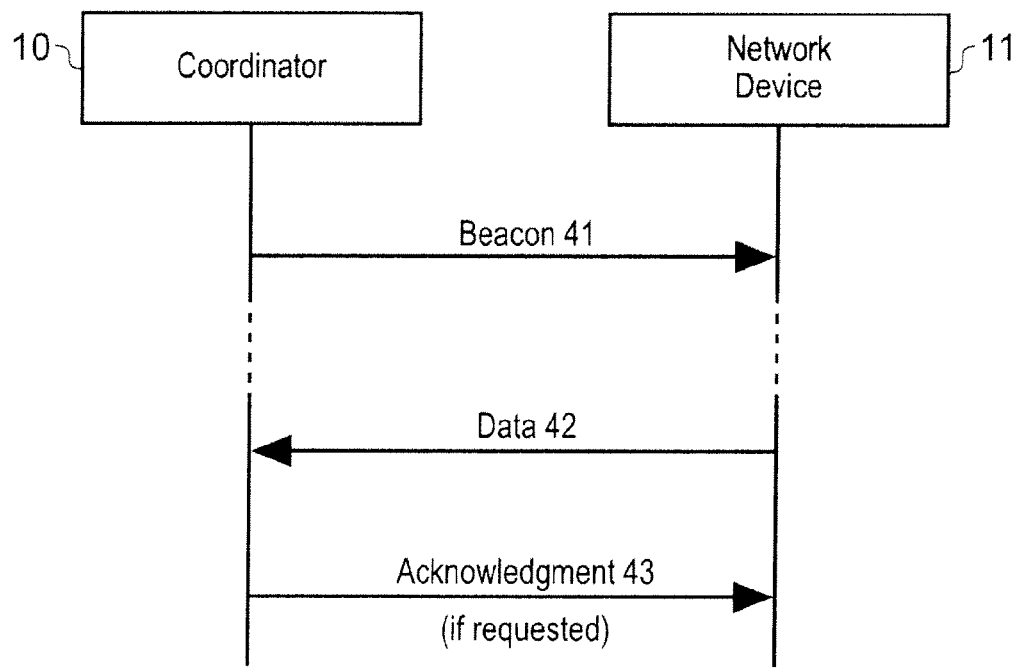
FIGS. 5 to 8 illustrate possible modes of data transfer between a network device and a co-ordinator in a IEEE 802.15.4 WPAN.
Figure 6:
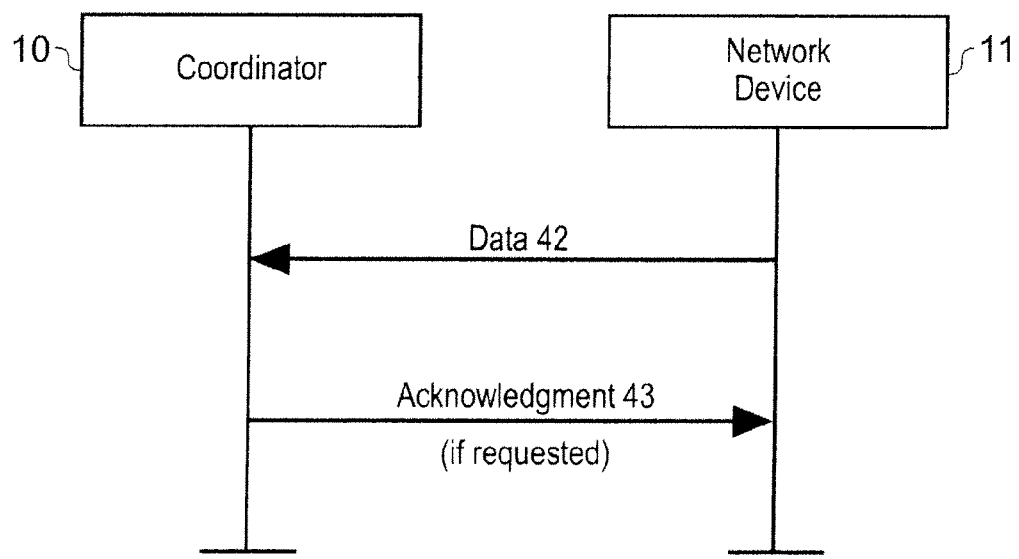

FIGS. 5 and 6 depict a transfer from the device (Network Device 11) and coordinator (Coordinator 10) for both the beacon-enabled and non beacon-enabled case respectively. The difference is that in the beacon-enabled case the device 1 must wait to receive a beacon frame 41 from the coordinator prior to sending the data (data frame 42) using CSMA-CA in the CFP, or using a GTS in the CAP; whilst in the non beacon-enabled case there is normally no beacon frame and the device 11 sends a data frame 42 at will using CSMA-CA. In either case, the coordinator acknowledges the successful reception of the data by transmitting an optional acknowledgment frame 43. These different types of frame are explained in more detail below.

If the recipient is unable to handle the received data frame for any reason, the message is not acknowledged. If the sender does not receive an acknowledgment after some period, it assumes that the transmission was unsuccessful and retries the frame transmission. If an acknowledgment is still not received after several retries, the sender can choose either to terminate the transaction or to try again. When the acknowledgment is not required, the sender assumes the transmission was successful.

Figure 7:
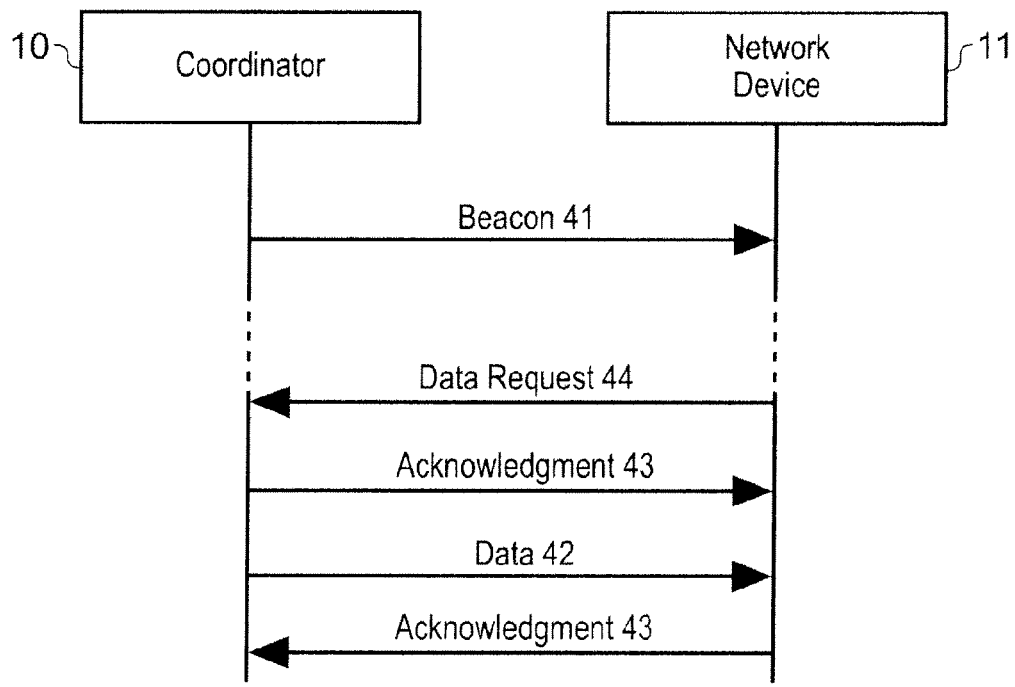
Figure 8:
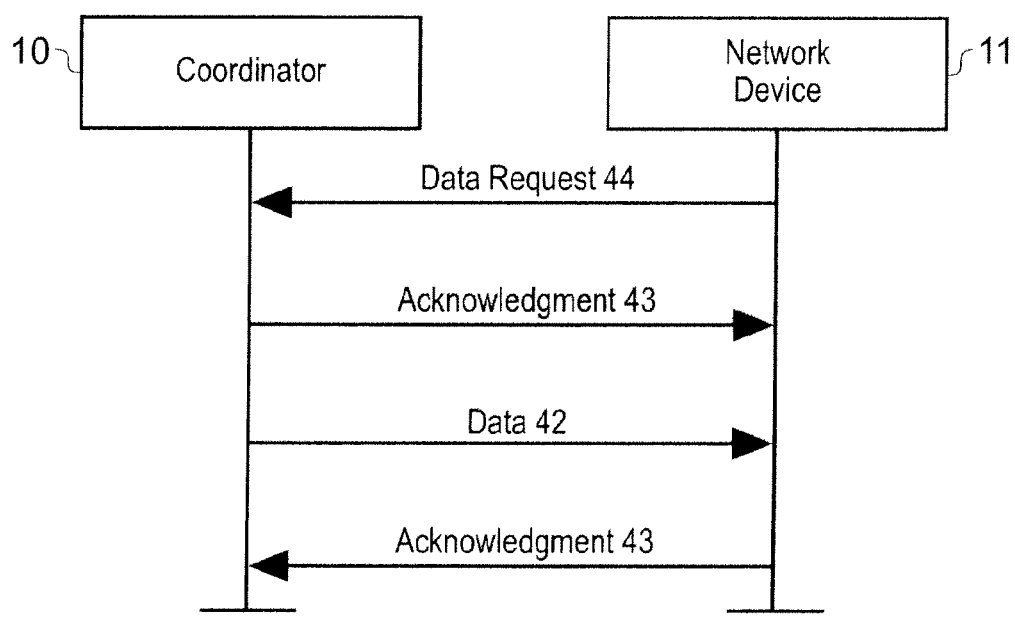

FIGS. 7 and 8 illustrate data transfer from a coordinator 10 to a device 11. When the coordinator wishes to transfer data to a device in a beacon-enabled WPAN (FIG. 7), it indicates in the beacon frame 41 that the data message is pending. The device periodically listens to the beacon frame and, if a message is pending, transmits a data request (MAC command) 44 requesting the data by CSMA-CA. The coordinator 10 acknowledges the successful reception of the data request by transmitting an acknowledgment frame 43. The pending data frame 42 is then sent using slotted CSMA-CA or, if possible, immediately after the acknowledgment. The device 11 may acknowledge the successful reception of the data by transmitting an optional acknowledgment frame 43. The transaction is now complete. Upon successful completion of the data transaction, the message is removed from the list of pending messages in the beacon.

In the non beacon-enabled case, the coordinator 10 which has data ready for a particular device 11 has to wait for a data request 44 from the device concerned, sent on a contention basis. Upon receiving such a request, the coordinator sends an acknowledgement frame 43 (this can also be used to signify that no data is ready, if that is the case), followed by the data frame 42, in response to which the device 11 may send another acknowledgement frame 43 in return.

For simplicity, the above procedures have considered only the above cases (i) and (ii) of data transfers between the device and coordinator, but in a peer-to-peer network, as already mentioned, data transfers will generally take place via mechanism (iii), involving one or more intermediate nodes, which increases the risk of collision and the delays involved.

As indicated in FIGS. 5 to 8, communications in a IEEE 802.15.4 network involve frames of four different types:
beacon frame 41, used by a coordinator to transmit beacons
data frame 42, used for all transfers of data
acknowledgment frame 43, used for confirming successful frame reception
MAC command frame 44, used for handling all MAC peer entity control transfers such as data requests.

Figures 9, 10, 11:
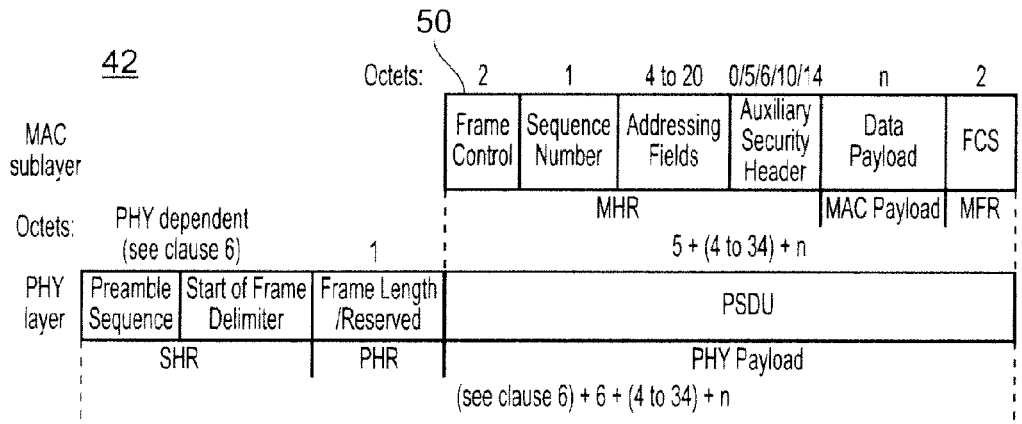
FIG. 9 shows a frame format used for a data frame in a IEEE 802.15.4 WPAN.
FIG. 10 shows the structure of a Frame Control field in the frame format of FIG. 9.
FIG. 11 is a table of possible values of frame type bits in the Frame Control field of FIG. 10.

The structure of each of the four frame types is quite similar, and is shown in FIG. 9 for a data frame 42 by way of example. In the Figure, the two horizontal bars represent the MAC sublayer and the PHY layer respectively. Time progresses from left to right, and the time length of each successive field of the frame is shown (in octets) above the field concerned. Every frame consists of a sequence of fields in a specific order, these being depicted in the order in which they are transmitted by the PHY, from left to right, where the leftmost bit is transmitted first in time. Bits within each field are numbered from 0 (leftmost and least significant) to k−1 (rightmost and most significant), where the length of the field is k bits.

The data to be sent via the data frame 42 originates from the upper layers. The data payload is passed to the MAC sublayer and is referred to as the MAC service data unit (MSDU). The MAC payload is prefixed with an MAC Header MHR and appended with a MAC Footer MFR. The MHR contains the Frame Control field 50 (see below), data sequence number (DSN), addressing fields, and optional auxiliary security header. The MFR is composed of a 16-bit frame check sequence FCS. The MHR, MAC payload, and MFR together form the MAC data frame, (i.e., MPDU). The MPDU is passed to the PHY as the PHY service data unit PSDU, which becomes the PHY payload. The PHY payload is prefixed with a synchronisation header SHR, containing a Preamble Sequence and a start-of-frame delimiter SFD, and a PHY header PHR containing the length of the PHY payload in octets. The preamble sequence and the data SFD enable the receiver to achieve symbol synchronization. The SHR, PHR, and PHY payload together form the PHY packet (the PHY protocol data unit PPDU).

The beacon frame 41, acknowledgement frame 43 and MAC command frame 44 have a similar structure, except that the MAC payload has a different function in each case, the acknowledgement frame having no MAC payload. Also, the beacon frame 41, the acknowledgement frame 43 and MAC command frame 44 originate in the MAC sublayer without involvement of the upper layers.

The frame control field 50 used in each type of frame is shown in more detail in FIG. 10. It consists of 16 bits assigned to subfields for different purposes as illustrated. In particular, the first three bits of the field denote the Frame Type 51: beacon frame 41, data frame 42, acknowledgement frame 43, or MAC command frame 44. The way the frame type is signified is shown in FIG. 11. Following the frame type bits 51 is a single-bit Security Enabled subfield 52 denoting whether or not security is enabled by the MAC sublayer. This is followed by a Frame Pending subfield 53 to indicate whether the sender has more data for the recipient. Next is an Ack. Request subfield 54 to indicate whether an acknowledgement is requested from the recipient. After this follow some further sub-fields 55, to 59 which are used for addressing purposes or reserved in the current IEEE 802.15.4 specification.

As mentioned, FIG. 11 is a table of the possible bit values for the Frame Type subfield 51, showing that values 100 and 101 are unused in the IEEE 802.15.4 specification.

Figure 12:
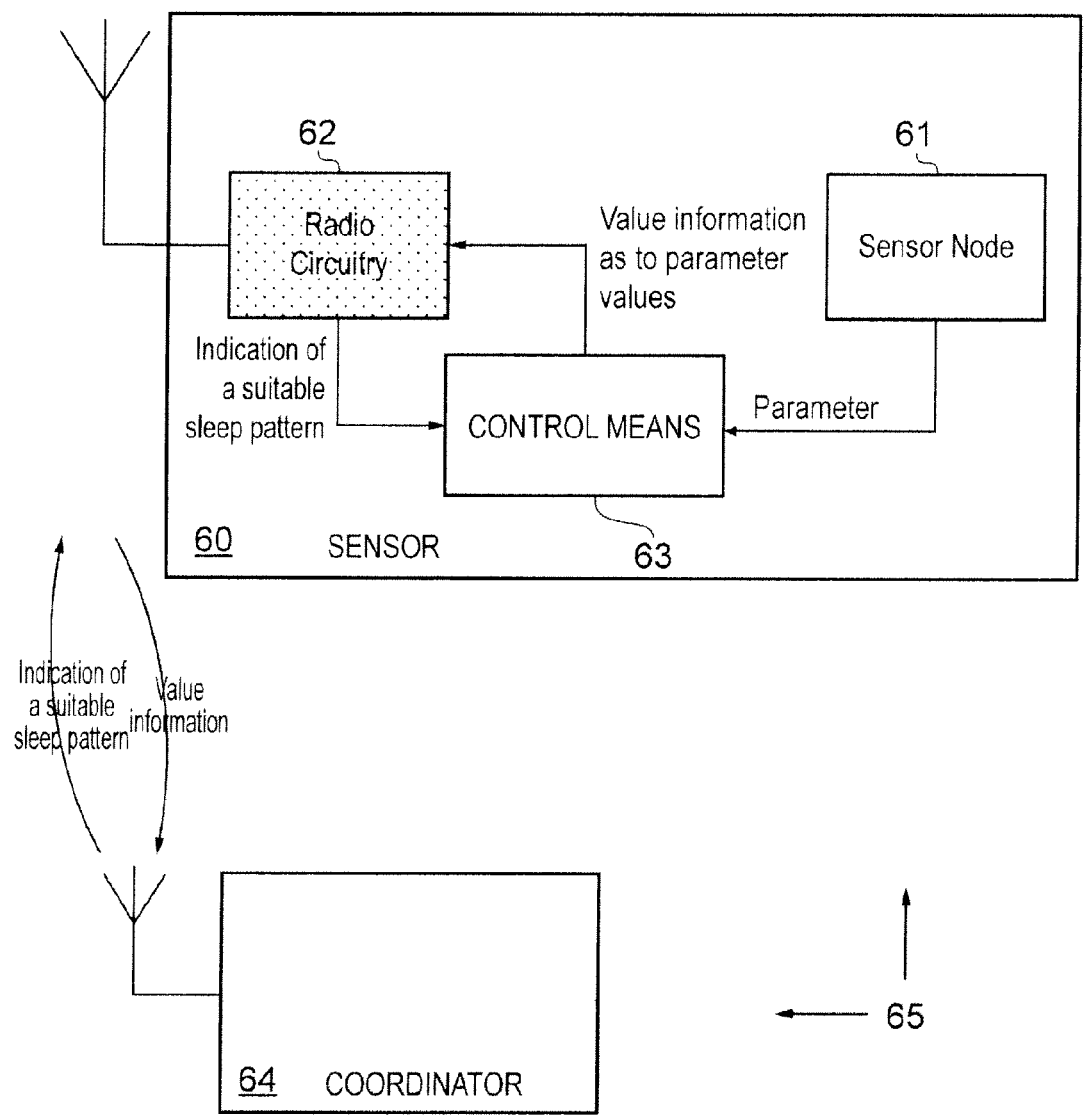
FIG. 12 is a schematic diagram showing a wireless sensor, and coordinator in a WSN according to embodiments of the present invention.

Having outlined the background of the present invention, reference is now made to embodiments of the invention. FIG. 12 is a schematic diagram representing a sensor 60, co-ordinator and WSN comprising both these network devices, all according to invention embodiments.

The sensor measures a parameter using sensor node 61. For example, the sensor 60 shown in FIG. 12 may measure a life parameter, such as the glucose level of a patient using sensor node 61. The glucose level (or other parameter) can be processed in the control means to provide value information for transmission over the WSN 65 to coordinator 64. Otherwise the parameter values themselves can form this information. A suitable sleep pattern is selected externally of the sensor and transmitted to the sensor by coordinator 64. The control means takes the received suitable sleep pattern into account when controlling the sleep pattern of the sensor. In some circumstances, the control means will simply implement the suitable sleep pattern. In other circumstances, the control means can take other factors such as a battery charge level into account so that the suitable sleep pattern is not implemented. Implementation of any sleep pattern is carried out by fine-tuning the radio circuitry 62.

In this and in the following scenarios, the messages sent indicating a change of sleep pattern are deemed themselves to have high priority and thus are given priority over other transmissions, for example routine and maintenance transmissions from the device or data transmissions which for some reason do not include the indication of the sleep pattern.

The description of the embodiments does not refer to any acknowledgements from the coordinator to the sensor whether direct or indirect and signal flow diagrams shown in the present application do not include them. However, since the sleep pattern messaging has a higher priority than other data/information, the sleep pattern messages are preferably acknowledged, and ideally before any change of sleep pattern.

Table 1 below gives an example of different suitable predefined sleep patterns based on different urgency levels of devices in a WSN. For example, in a network for medical use such as an MBAN, a low duty cycle sleep pattern can be used for non-medical devices (for example for a doctor's PDA, a watch or a mobile phone of the patient which are connected into the WSN). As can be seen from Table 1, such non-medical devices thus have the longest sleep time or percentage sleep time. An indication of this sleep pattern can be sent over the WSN, for example as urgency bits in a frame control field of a transmission frame. In this example, a non-medical device is shown to have urgency bits 00. Table 1 shows a medical device in a normal condition having a normal medical pattern sleep with a slightly higher duty cycle and denoted by urgency bits 01. With a slightly abnormal condition in such a medical device the duty cycle is again increased slightly and the urgency bits are 10. Finally, for a medical device in an emergency situation there is a dramatic increase in the duty cycle or a continuous wake up. Urgency bits 11 are used to denote this emergency condition. In this example for a medical sensor device the transition between the normal and slightly abnormal situation and between the slightly abnormal and emergency situation can be triggered by the measured parameters crossing each threshold in each case. As a skilled reader will appreciate, the increased urgency may be down to the parameter either falling or rising or both, if the parameter has an acceptable range of values, with increasingly unacceptable values to either side of the acceptable range defined by a number of thresholds.

TABLE 1 sleep patterns and urgent bits with a mixed network of medical and non-medical devices.

| Urgency bits | Urgency level | Sleep pattern |
| --- | --- | --- |
| 00 | Non-Medical Device | Longest Sleep Time |
| 01 | Medical Device with normal Situation | Normal Medical Pattern Sleep |
| 10 | Medical Device in Slightly Abnormal conditions | Increase slightly duty |
| 11 | Medical Device in Emergency Situation | Increase dramatically or continuous wake up |

Also, as briefly set out above, in some embodiments the change in sleep pattern can be triggered by a change in parameter values over time or in a rate of change or parameter values over the time or any other suitable criteria. For example, a very rapid change in pulse rate may be due to a pathological arrhythmia, rather than physiological conditions and therefore suitable for triggering a changed sleep pattern taking a rate of change into account.

The bit values in Table 1 are fixed for all devices and their interpretation is known to the sensor, the coordinator or controller and to any central monitoring unit, which may be provided as part of the WSN, or separately.

Figure 13:
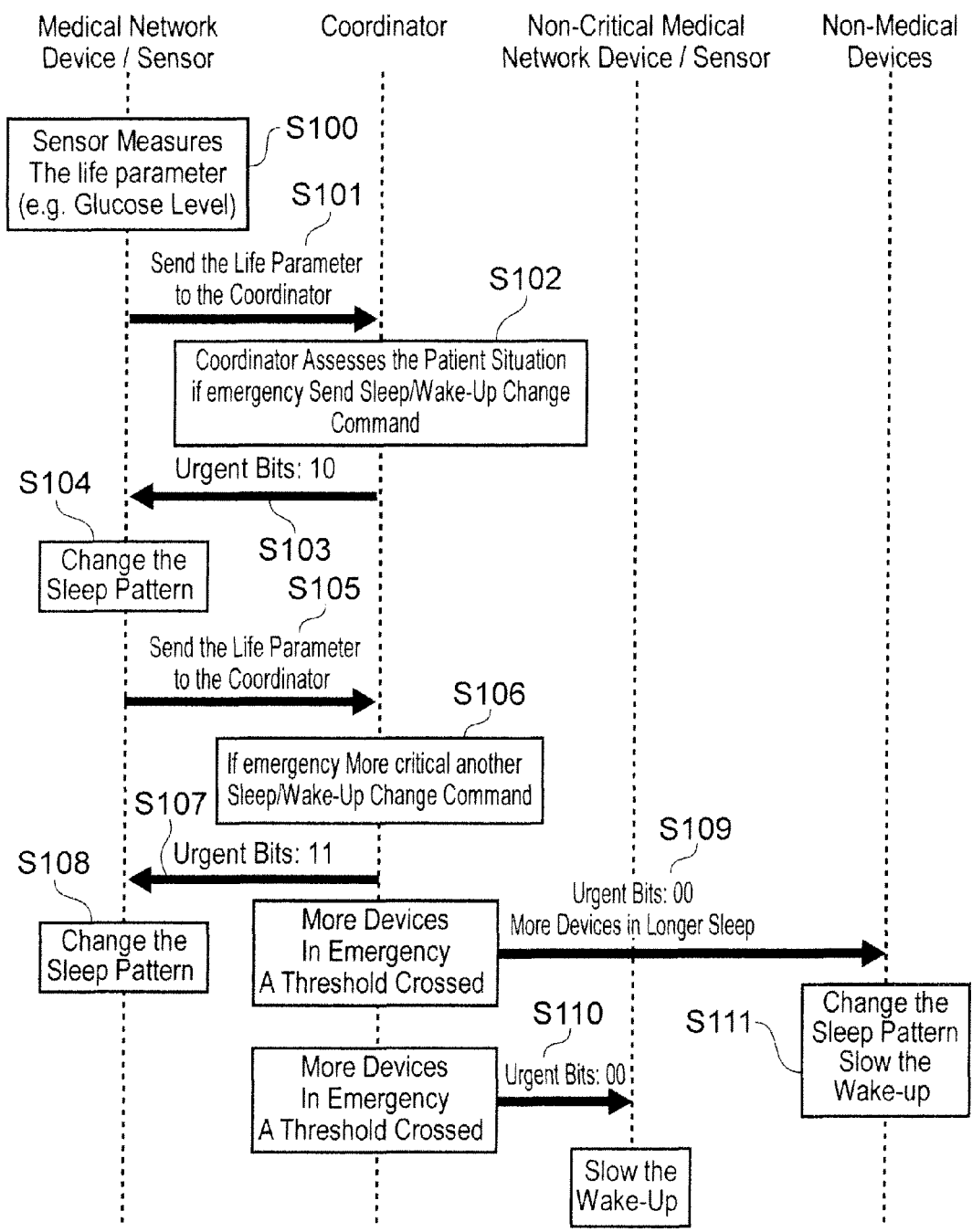
FIG. 13 is a flow diagram showing signal flow between a device and a coordinator with a changing parameter value.

FIG. 13 is a flow diagram using the bit values of Table 1 as an example, which shows the signal flow between a sensor and device a coordinator given an increasingly abnormal situation defined by the life parameter or other parameter measured information about the parameter values. Initially the sensor measures S100 a life parameter such as glucose level and sends information about the parameter values S101 to the coordinator. The coordinator assesses S102 the situation in the sensor, for example by comparing the level to predefined thresholds. In response to this comparison it determines a suitable sleep pattern and sends S103 an indication of the of the suitable sleep pattern to the coordinator as urgency bits 01, indicating a normal situation. Although the transmission is shown directly from the sensor to the coordinator in this and the following diagrams, the skilled reader will appreciate that in a peer-to-peer network, the transmission may be indirect, via other nodes. Once the sensor receives the indication of the sleep pattern from the coordinator, it can implement this S104. The sensor continues S105 sending information about parameter values to the coordinator. Subsequently, the patient goes into an emergency condition (for example as defined by the comparison of glucose level to the thresholds). At this stage the coordinator changes S106 the suitable sleep pattern to a higher frequency mode. It also sends S107 an indication of severe emergency conditions using bits 11 to the sensor and the sensor again reflects S108 the new sleep pattern. If a predetermined number of devices are in emergency (as defined as example by crossing parameter thresholds) the coordinator transmits lower duty-cycle sleep patterns to lower priority devices. For example, non medical devices may receive an indication that lower duty-cycling is required as shown in step S108. Although the urgency bits are shown as set to 00 (the longest sleep time) in this example, which is the scheme permanently allocated to these non-medical devices in Table 1, a slightly modified bit scheme will allow these devices to have at least two different bit patterns, with a lower duty cycle bit scheme sent at this stage to the non-medical device. Also dependent on the number of devices in emergency, with maybe a higher threshold than the first threshold, non-critical medical network devices and sensors may be sent an indication of a suitable sleep pattern with lower duty cycling. For example, the coordinator may transmit S110 urgency bits 00, defining a sleep pattern normally only implemented for non-medical devices, having the longest sleep time.

Figure 14:
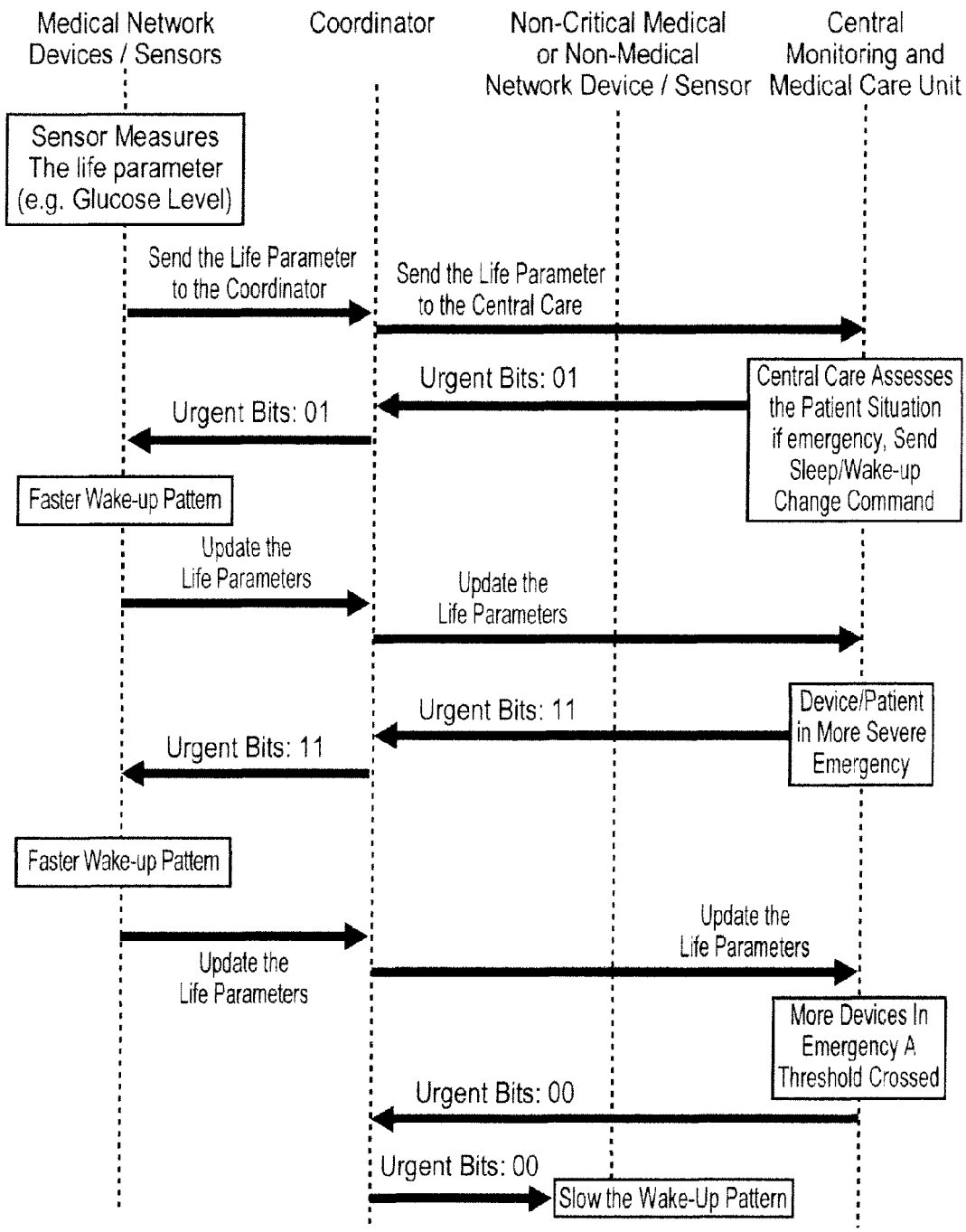
FIG. 14 shows an equivalent flow diagram to FIG. 13 with processing carried out in a central monitoring unit.

Although FIG. 13 shows the situation in which the coordinator determines the suitable sleep pattern for the network devices, such processing may be carried out partially or entirely by the central monitoring unit. FIG. 14 shows an equivalent flow diagram to FIG. 13 and therefore is not explained in full. The difference between the two diagrams is that FIG. 14 shows processing taking place in a central monitoring, unit, with the coordinator merely acting as a relay between the network devices and the central monitoring unit. This scenario allows either automatic or staff-selected centralised control of sleep patterns.

Table 1 and FIGS. 13 and 14 relate to a centralised sleep fine-tuning capability but do not consider the battery level of a device. In this embodiment, the sensor implements a suitable sleep pattern based on the indication from the coordinator alone. Hence, the medical situation is a predominant factor and the scenario is particularly suitable for intensive care situation when the medical assistant is present.

In other embodiments, the sleep pattern can be modified by the sensor in dependence upon not only the indication set by the coordinator but also on a battery check. The battery level can be transmitted to the coordinator for action. FIG. 15 is a table 70 demonstrating an example of battery bits that can be used in a control field of a transmission frame to denote battery charge level. The percentage charge is divided into four different levels each with a range of 25%. Alternatively fewer or more levels may be chosen and the scale need not be divided linearly. For example, the top charge level may be of 50 to 100% for example and other charge levels may cover a smaller range. As for the urgency bits, two bits are used, allowing division of the battery charge into four different levels.

Figure 16:
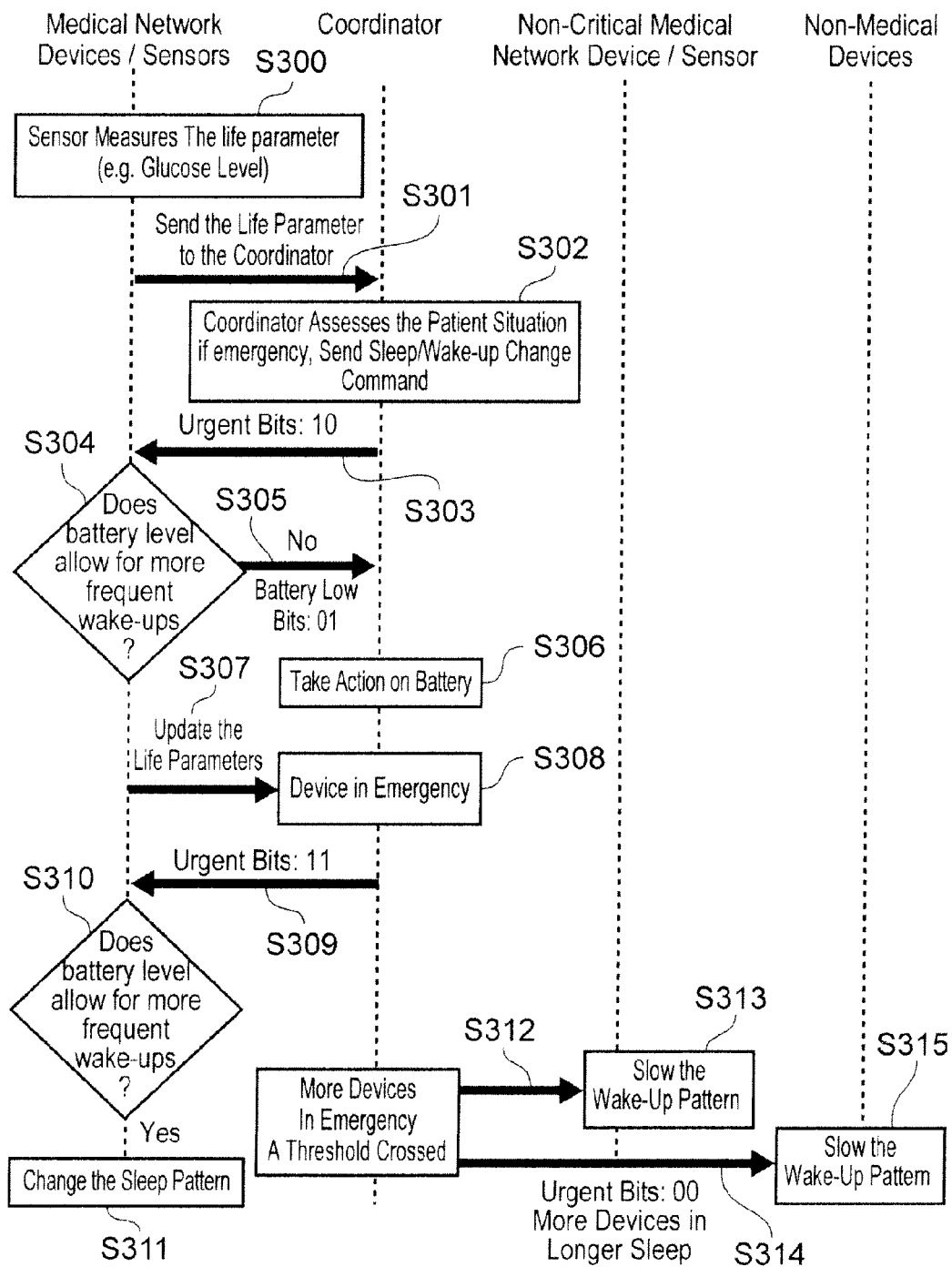
FIG. 16 is a flow diagram showing signal flow between a device and a coordinator with a changing parameter value and battery charge status.

FIG. 16 is a flow diagram showing signal flow between a device and a coordinator with a changing parameter value and changing battery charge status. Such embodiments can be useful in medical telemetry applications in which urgent medical assistance may not be available.

In such cases, the battery level can be included in the sleep pattern control to make sure that higher duty cycle sleep patterns do not lead to complete depletion of the battery charge. In these invention embodiments, a higher duty cycle pattern which is suitable given the parameter values measured can only be implemented if the battery level is appropriate. Otherwise, the current sleep pattern is maintained. Equally, if the battery level falls, a lower duty-cycle than that suitable for the parameter values measured may need to be selected.

In this scenario, emergency data is still recorded but at a slower pace than is ideal. This is particularly advantageous when the device is an implant, for example and the battery cannot be replaced immediately (because an operation is necessary to access the battery). It is also helpful for telemetry emergency applications when the nurse or medical assistants are not around during the night to change the batteries for non-implant applications. For example, in homecare it is advantageous to continue recording any rare medicals or emergency situations which may occur for a couple of minutes only during the night with a higher accuracy and sampling rate. At the same time, the sensor can send a message of low battery level to the coordinator. FIG. 16 shows a progression to an emergency status when a life parameter such as glucose level rises. Starting with a medical device in a normal situation, urgency bits 01 as set out in Table 1 may be transmitted in one or more current transmission frames. In step S300 the sensor measures a parameter such as glucose level. The sensor sends the parameter to the coordinator in step S301 and the coordinator assesses the patient situation in step S302. If there is a heightened level of emergency, urgency bits 10 are sent to the sensor. At this point the sensor checks the battery level S304 to determine whether the sleep pattern indicated by these urgency bits is allowable. If it is not, the sensor sends a battery low message to the coordinator in step S305, for example using battery bits 01. The coordinator then takes action S306 on the battery. In a next phase the sensor updates the parameter values being sent to the coordinator which leads a higher emergency state being detected by the coordinator in step S308. The coordinator sends urgency bits 11 to the sensor in step S309. As a result in step S310 the sensor checks to see if the battery level will allow more frequent wakeups. If so the sleep pattern is changed to correspond to the urgency bits 11 in step S311. At the same time, the sensor transition to the emergency state leads to the number of devices in an emergency crossing in a threshold. A coordinator takes action in step S312 by sending urgency bits 00 to non-critical medical devices to slow their wake up pattern in step S313. In step S314, the coordinator sends urgency bits indicating the slowest suitable wakeup pattern to non-medical devices (although these are shown as bits 00, and do not fit into the scheme of Table 1, the skilled reader will appreciate how to use more bits or other methodology to indicate a further sleep pattern).

Figure 17:
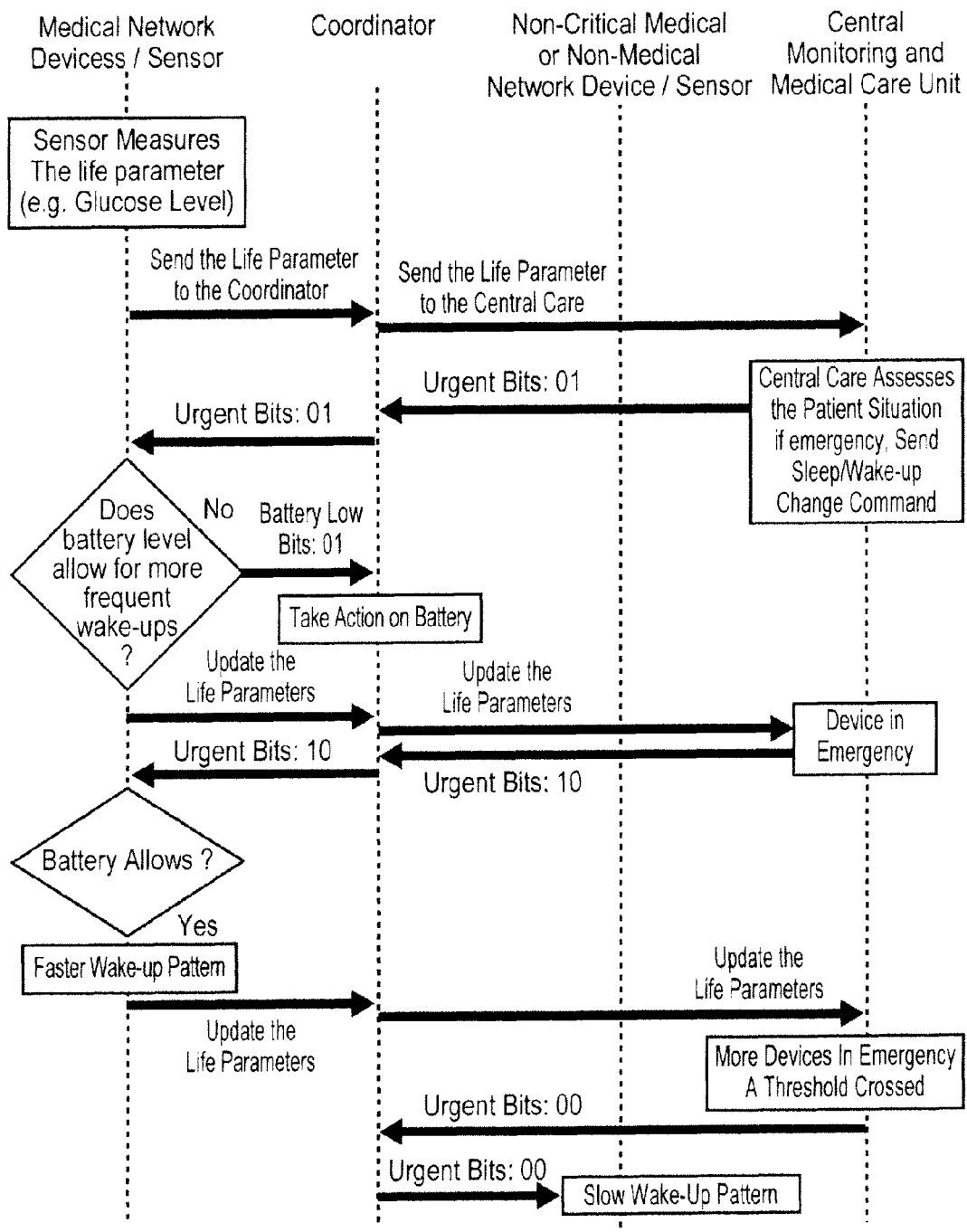
FIG. 17 is a flow diagram equivalent to FIG. 16, with a central monitoring unit.

FIG. 17 shows an equivalent scenario in which the central care unit is in control of the processing and decisions and the coordinator acts as a relay, with the exception of the battery action, which is handled by the coordinator without necessarily passing the battery low bits on to the central monitoring unit.

FIG. 18 is a table 70 demonstrating one way of associating sleep patterns to levels of battery charge. Here the sleep patterns shown may be for a single category of device so that the division into medical and non-medical devices shown in the previous Figures and Table 1 is no longer applicable. The lowest level<1 (0 to 25%) only allows a low wake up sleep pattern whatever the outcome of the threshold comparison; the second level L2 additionally allows a medium wake up pattern; the third level L3 (50 to 75%) additionally allows a higher wake up pattern and the top level L4 (75 to 100%) additionally allows a continuous wake up pattern so that all the possible sleep patterns are permitted. Thus the battery charge level overrides a sleep pattern selected according to parameter values if necessary. There is a one-to-one correspondence between the limits between the levels L1 to L4 and the thresholds defined for the parameters, for reasons of practicality, so that each limit crossed between two levels moves the boundary for acceptable sleep patterns by one predefined sleep pattern.

Figure 19:
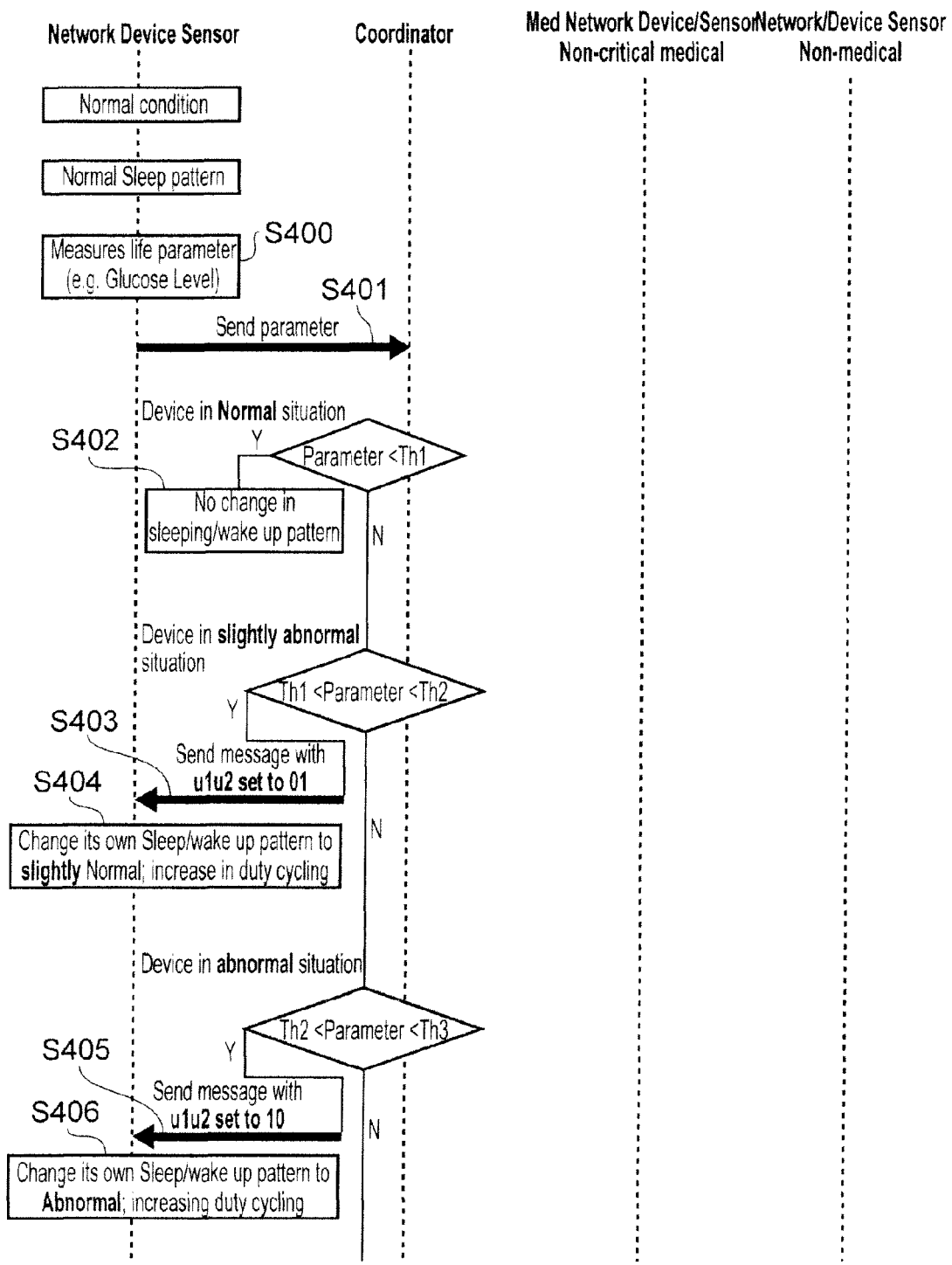
FIG. 19 is a flow diagram showing another method in a device of selecting a sleep pattern without considering battery level.
Figure 19:
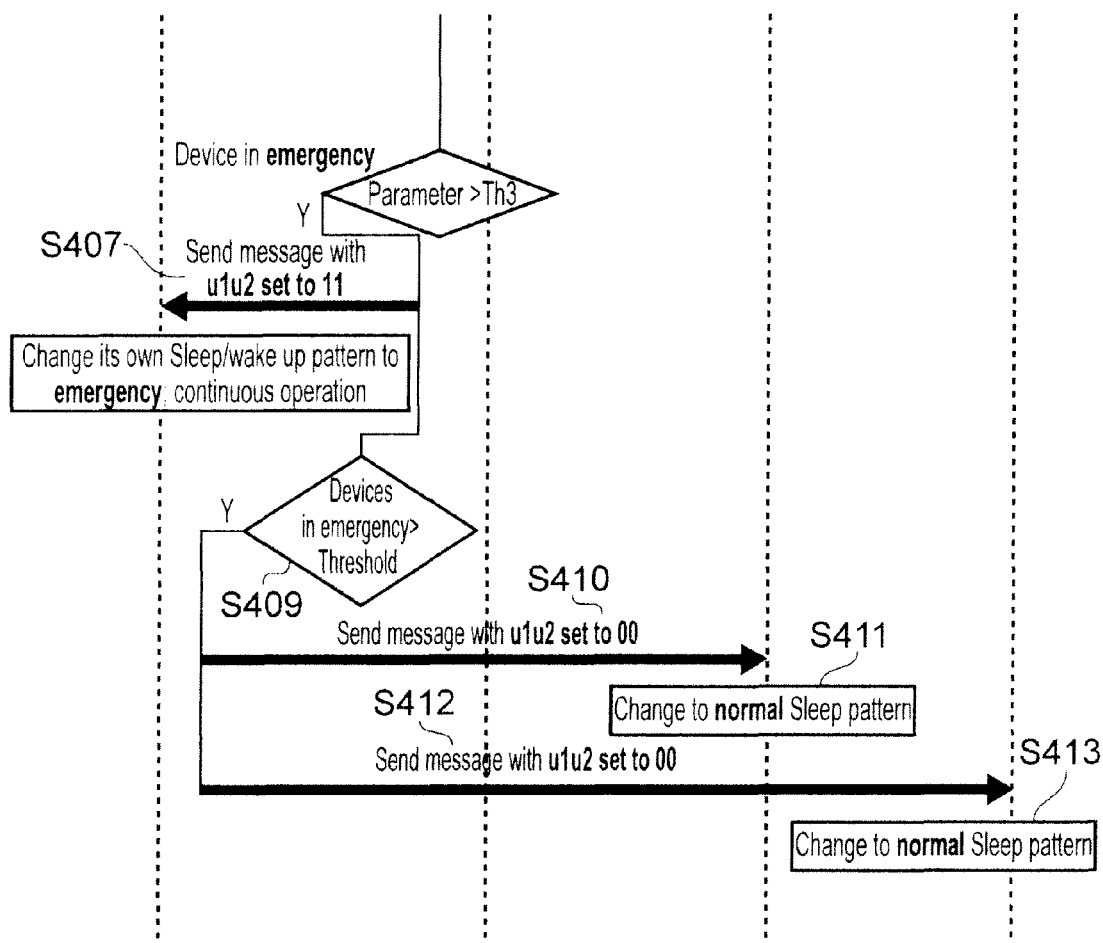

FIG. 19 is a flow diagram showing another method in a device of selecting a sleep pattern without considering battery level. Here, as for FIG. 18, only one category of device is considered. The coordinator sends frames with urgency bits which are set according to Table 2 shown below.

TABLE 2 sleep patterns and urgency bits in a network of devices of the same type

| Urgent bits: u1u2 | Urgency level | Upper threshold | Sleep/wake up pattern |
|---|---|---|---|
| 00 | Device in Normal Condition | Th1 | Normal sleep/wake up pattern; Longest Sleep Time, very low duty cycle |
| 01 | Device in Slightly Abnormal condition | Th2 | Slightly Abnormal Sleep/wake up Pattern; Slight increase of duty cycle |
| 10 | Device in Abnormal condition | Th3 | Abnormal Sleep/wake up Pattern; increase of duty cycle |
| 11 | Device in Emergency | | Emergency Sleep/wake up Pattern; dramatic increase of duty or cycle or continuous wake up |

In a normal condition the coordinator sends urgency bits 00 (with parameter values up to threshold Th1). With a slight abnormality, urgency bits 01 (from Th1 up to threshold Th2 of the measured parameter) are sent. In abnormal conditions up to threshold Th3 of the measured parameter the device sends urgency bits 10. From measured parameter values of Th3 upwards, the device is in emergency and sends urgency bits 11.

Assuming the sensor starts in a normal condition with a normal sleep pattern (00) at the start of FIG. 19, parameter values are measured S400 and sent S401 to the coordinator. The coordinator then assesses the urgency of the situation by comparing the values against thresholds Th1 to Th3. If the device is in a normal situation, there is no change S402 in the sleep pattern. In a slightly abnormal situation defined between thresholds Th1 and Th2, the coordinator selects a different suitable sleep pattern with an indication of the new sleep pattern sent S403 to the sensor as bits 01. The sensor undergoes an increase S404 in the duty cycle. If the parameter falls between the second and third thresholds Th2 and Th3, the device is in an abnormal situation, and the corresponding message is sent S405 from the coordinator with urgency bits 10. The sleep pattern is changed 5406 again to reflect the abnormal situation. Finally, if the measured parameter is above parameter Th3, the device is in an emergency and a message with urgency bits 11 is sent S407 by the coordinator. The sensor changes 5408 its duty cycle again to the highest level.

If the number of devices in emergency, or the number of higher priority devices in emergency crosses a threshold S409, a message is sent S412 to one or more non-medical devices, causing them to reduce S413 their sleep pattern, for example to the lowest level. At the same, or potentially a higher threshold, and equivalent message S410 is set to cause non-critical medical devices to lower their duty cycle.

Figure 20:
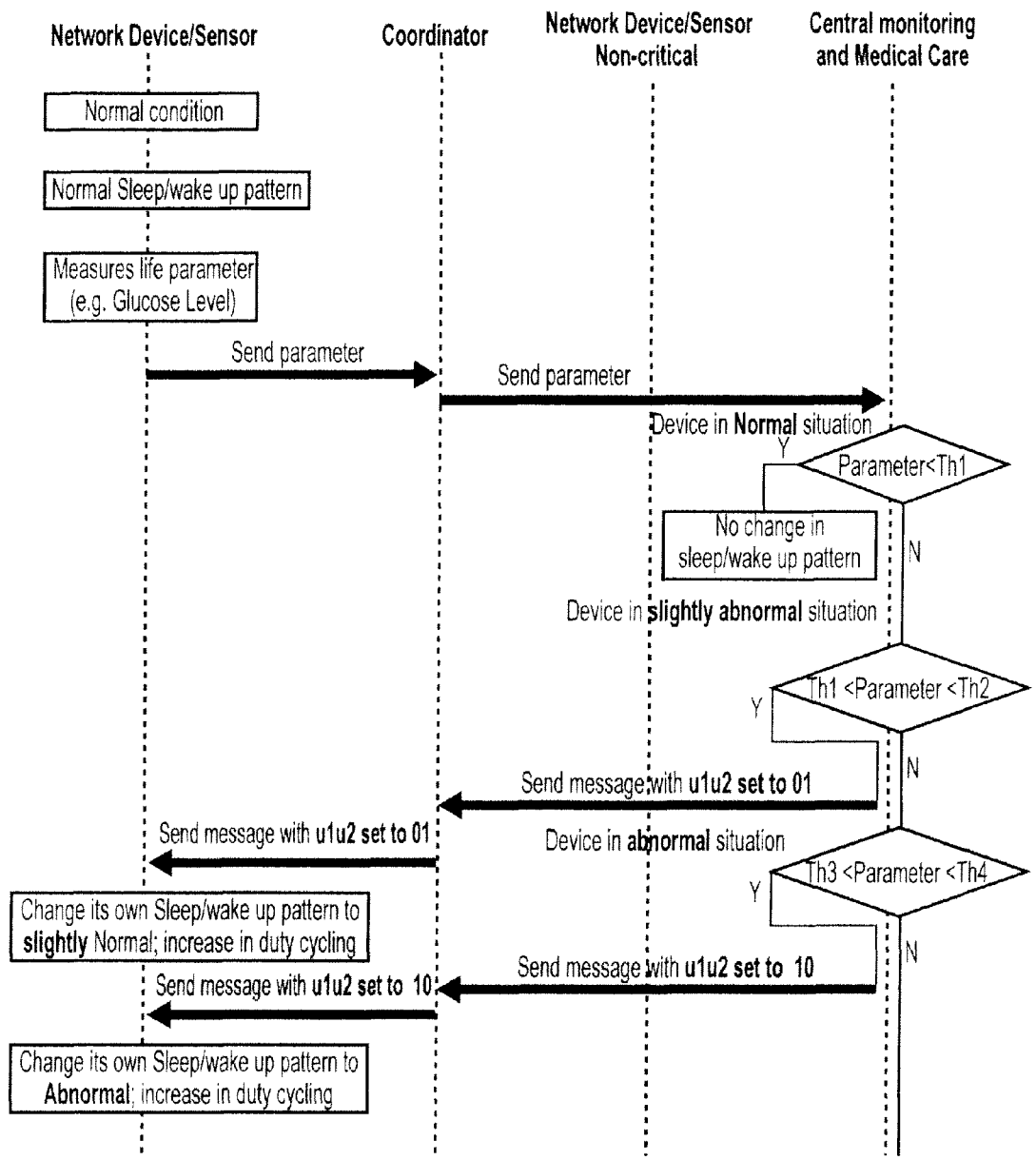
FIG. 20 is an equivalent diagram to FIG. 19, in which the central monitoring unit carries out the processing and control signalling handled by the coordinator in FIG. 19.
Figure 20:
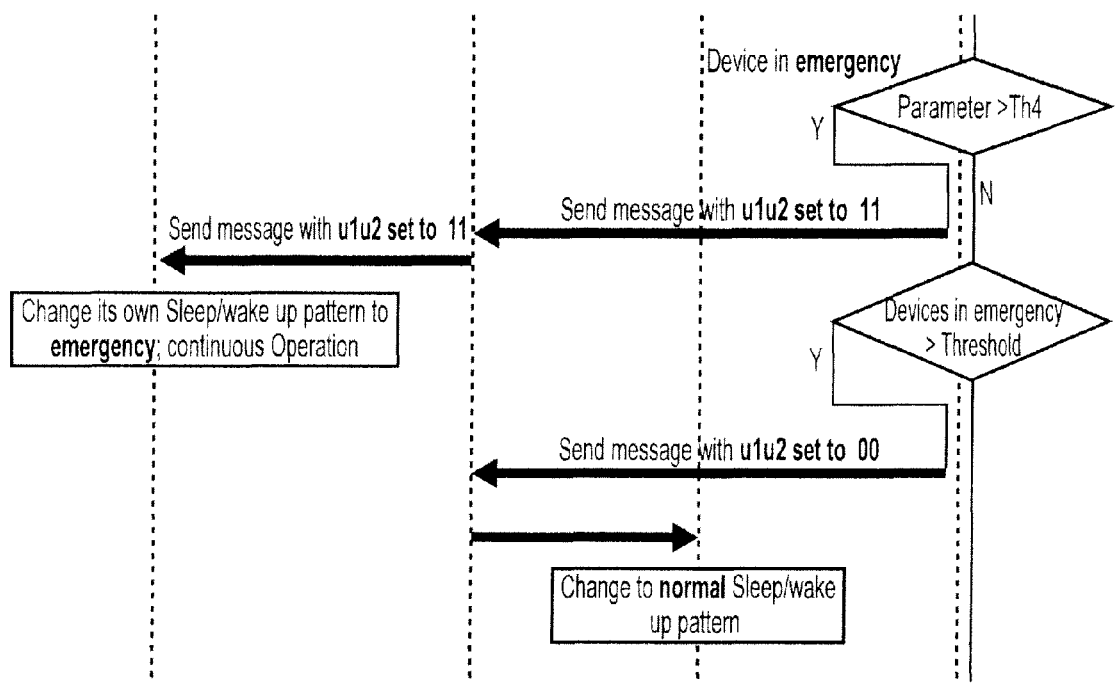

FIG. 20 is an equivalent diagram to FIG. 19, in which the central monitoring unit carries out the processing and control signalling handled by the coordinator in FIG. 19. Here the coordinator simply acts as a relay.

Figure 21:
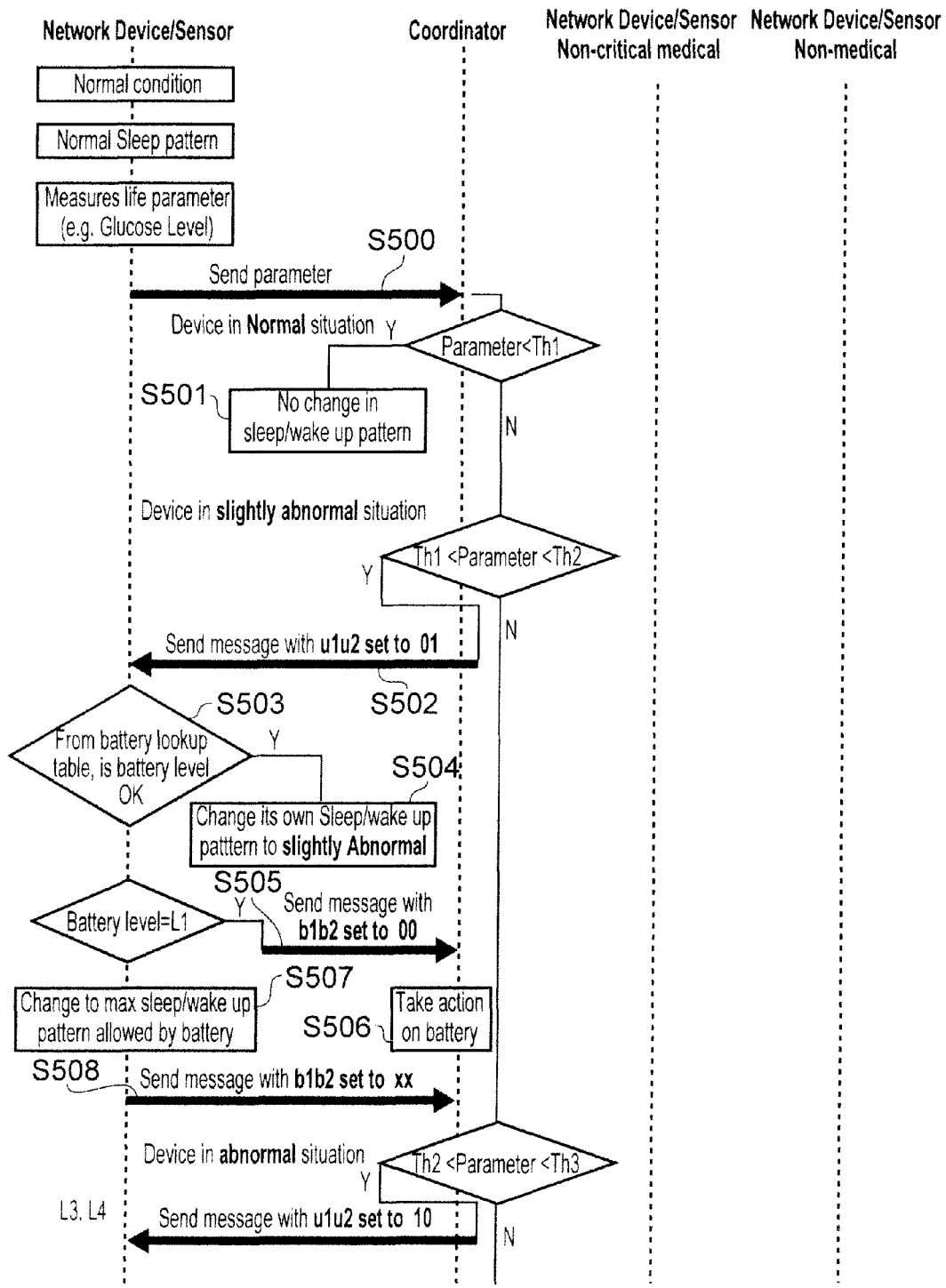
FIG. 21 is the corresponding flow diagram to FIG. 19 with the battery level now being taken into consideration.
Figure 21:
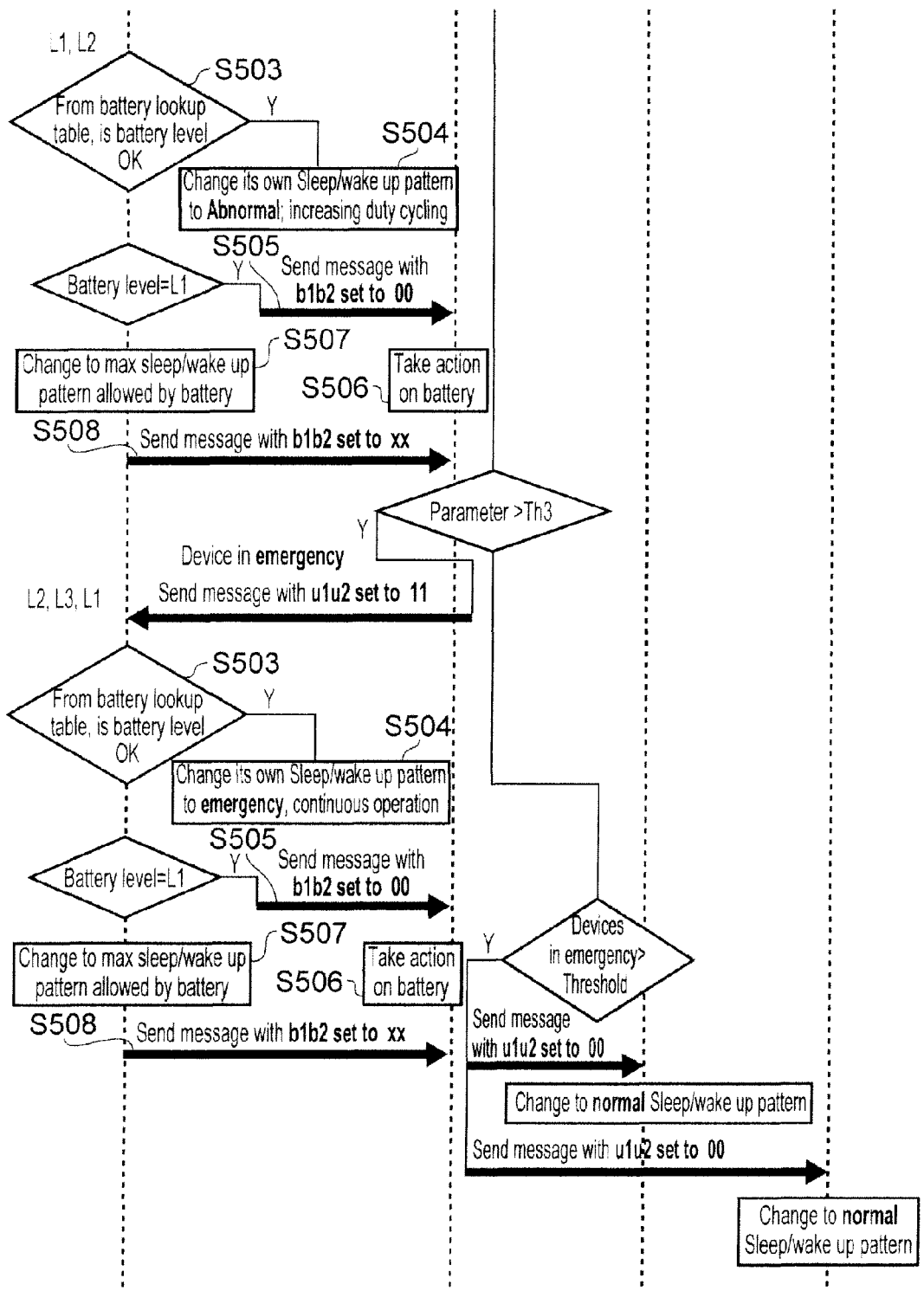

FIG. 21 is the corresponding flow diagram to FIG. 19 with the battery level now being taken into consideration. In this embodiment, battery bits are transmitted from the sensor and urgent bits are transmitted from the coordinator. The urgency bits sent by the coordinator indicate a suitable sleep pattern taking the parameter measurement only into account and the battery bits sent by the sensor show the actual sleep pattern in operation, which is the maximum allowed sleep pattern. At the beginning of the procedure we assume that the sensor has a normal sleep-wake up pattern and a fully charged battery, and information about sensor's parameter values is sent S500 to the coordinator. The coordinator then assesses the parameter to see if it falls below Th1, between Th1 and Th2, between Th2 and Th3, or above Th3. If the parameter is below Th1 no change S501 in the sleep wake up pattern is required.

If the life parameter falls between the first and second threshold Th1 and Th2 a message is sent to the sensor in step S502 with urgency bits set to 01. The battery level is checked S503. If the sleep pattern selected by this parameter measurement is allowed by the control means in accordance with the table in FIG. 18 (that is, in this case, if the battery charge is at L2, L3 or L4) the sleep pattern is changed S504 to slightly abnormal. If the battery is at L1, there can be no change of sleep pattern but a message is sent S505 to the coordinator with the battery bits are set to 00 to reflect the battery level L1. The coordinator takes action S506 on the low battery. Otherwise the sleep pattern is changed S507 to the maximum level allowed by the battery and a message is sent to the coordinator in step S508 with the battery bits set to xx, which is the battery level for the maximum allowed sleep-wake up pattern. If the battery level is ok for a device in a slightly abnormal situation, this would cover levels L2, L3 and L4. Thus the only other alternative is that the battery level is L1. However, for ease of implementation, this extra step may be included for this parameter level as for the other parameter levels. Otherwise it may be omitted.

If the parameter falls between Th2 and Th3 and the device is thus in an abnormal situation, then a message is sent to the sensor to indicate a suitable sleep pattern with urgency bits 10. The battery level is again checked to see if it is acceptable. If it is ok for the required sleep pattern change (that is at L3 or L4), the device changes to an abnormal sleep pattern. If on the other hand the battery level is at L1, no change to the sleep pattern is available and a message is sent to the coordinator with the battery bits are set to 00. Action on the battery is taken. Otherwise, (if the battery level is at L2) the sleep pattern is changed to the maximum allowed by the battery (01) and a message is sent with the battery bits set to xx which is the maximum allowed sleep pattern channel access is adjusted. Here xx is 01, to reflect level L2.

Finally, if the parameter falls above threshold Th3, a message with the urgency bits set to 11 is set to the sensor and the battery level is checked. It is only ok if it is at level L4. In this case the device changes its own sleep pattern to emergency. On the other hand if the battery level is at L1, a message is sent to the coordinator with the battery bits set to 00. For any other level (here levels L2 and L3) the sleep pattern is changed to the maximum pattern allowed and battery bits sent are set to xx, being the maximum allowed sleep pattern (that is, the implemented sleep pattern) as before.

Once the coordinator has assessed where the parameter lies between the thresholds, this information is used to check how many devices are in an emergency state. If the number of devices has exceeded a threshold, then action is taken to send a message with urgency bits set 200 to non-critical medical devices and non-medical devices. These devices then change to a normal (lowest) duty cycle sleep pattern.

Figure 22:
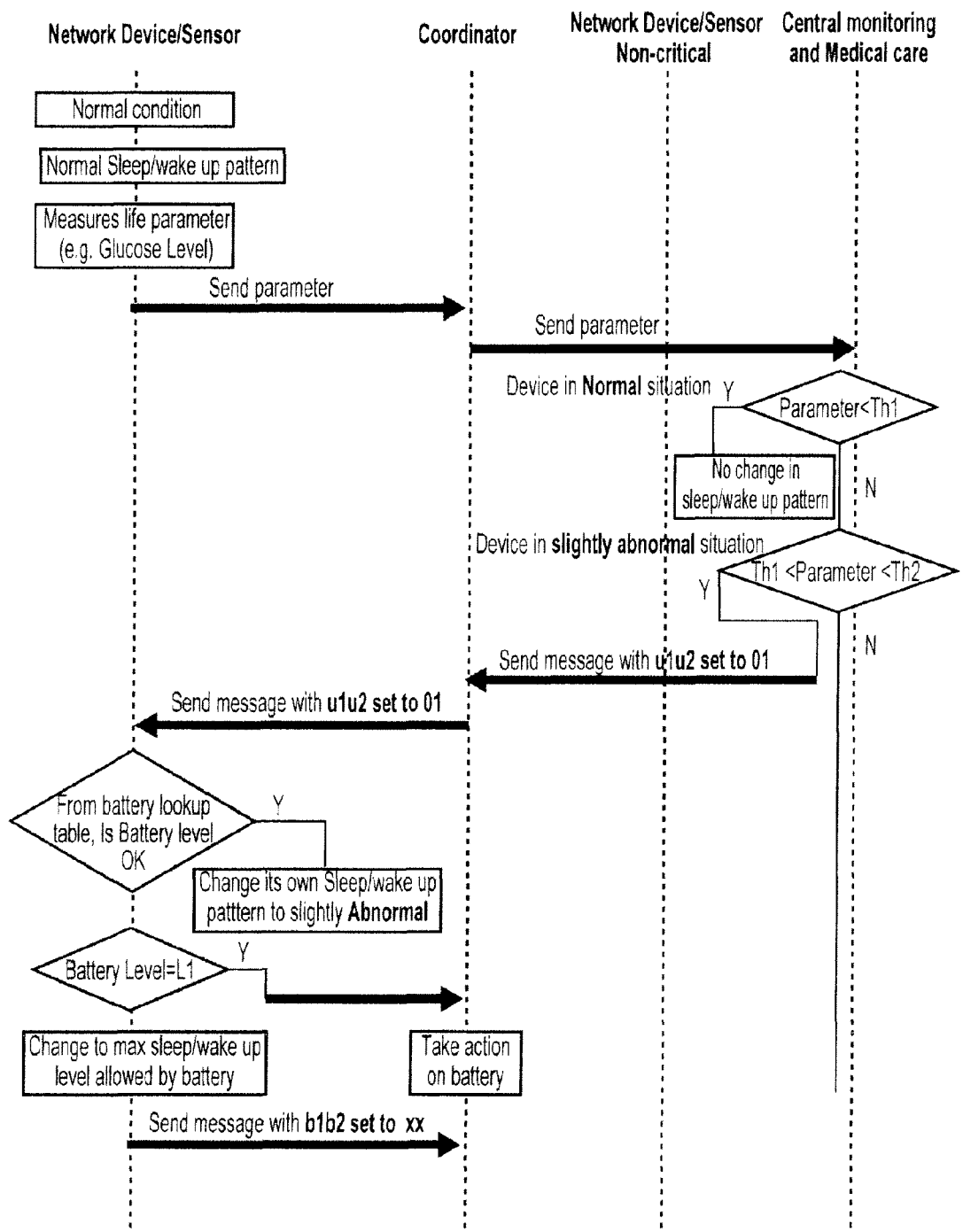
FIG. 22 is a flow diagram equivalent to FIG. 21, additionally including a central monitoring unit.
Figure 22:
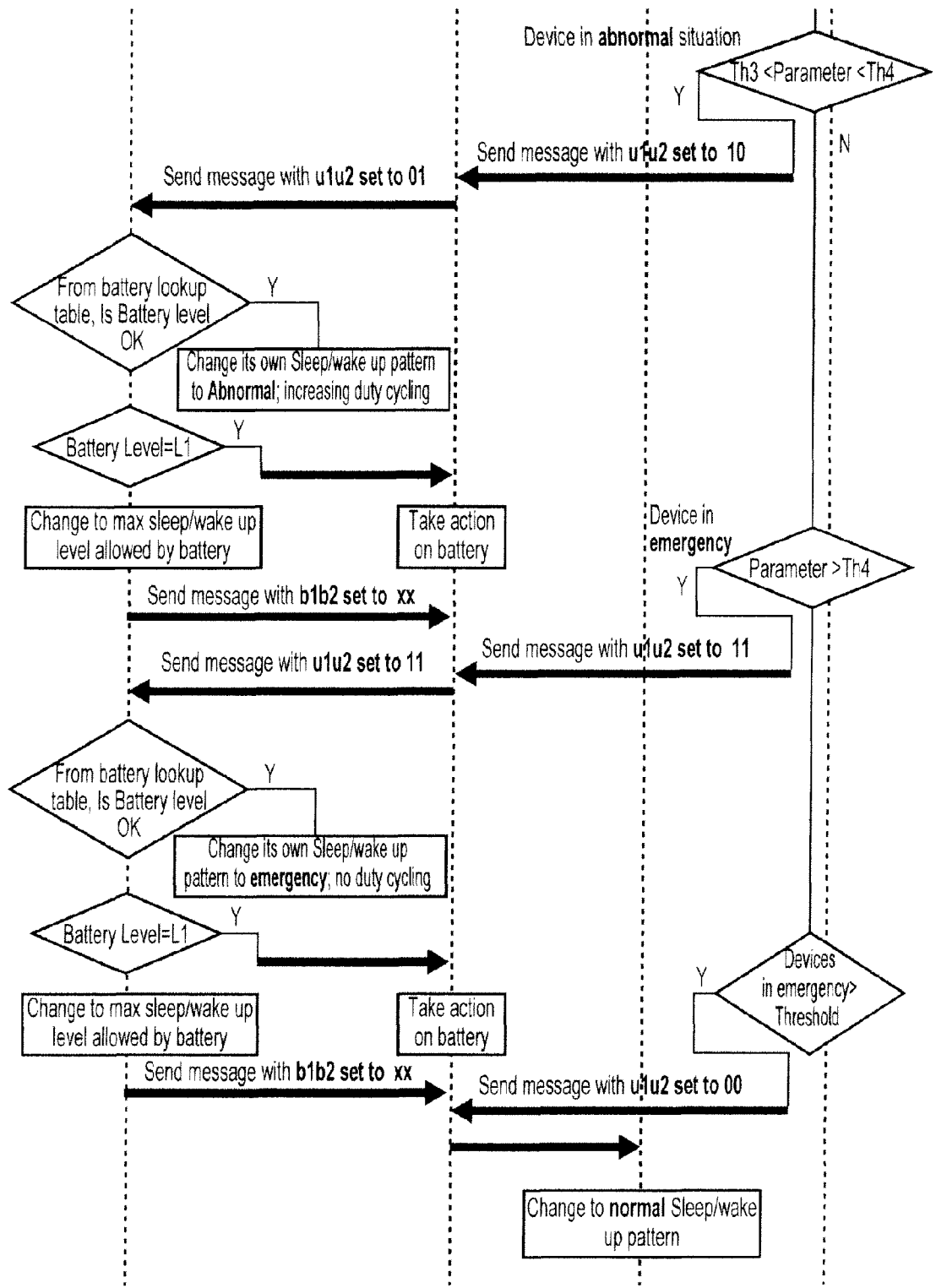

FIG. 22 is an equivalent diagram to FIG. 21 but shows the comparison functionality and setting of urgency bits carried out by the central monitoring and medical care unit. The coordinator functions only as a relay, apart from its role in taking action on the battery. Thus all the messages sent from the sensor with respect to battery levels are handled by the coordinator and not necessarily forwarded to the central unit.

Alternatively, the battery bits can be used separately from the parameter measurement, purely as an indicator of battery level. The co-ordinator can then calculate the actual sleep pattern implemented from the combination of the battery bits, a look up table and the parameter values or the suitable sleep pattern it has transmitted to the sensor. This alternative gives more detailed information about battery levels but requires increased processing capability at the co-ordinator.

The following description indicates how the above signalling protocols can be accommodated within a communication standard such as IEEE 802.15.6 which is currently under development based on IEEE 802.15.4. FIG. 23 illustrates a modification to the IEEE 802.15.4 frame format to indicate urgency of the message so that the urgent message is assigned high priority over others. Two urgency bits 81, 82 are shown and are employed by the sensor in transmission frames such as any or all of data frames, acknowledgement frames and MAC command frames to indicate the changing suitable sleep pattern by the coordinator to the sensor.

These urgency bits can also be used to differentiate between non-medical and medical devices as shown for example in Table 1 or for differentiation of priority between different device types in an industrial application. As can be seen from the comparison with FIG. 10, the frame control is extended by one octet in which two bits (urgency U1 and urgency U2) are used to indicate different levels of urgencies which correspond to different sleep patterns.

FIG. 24 additionally includes two bits 83, 84 related to the battery level. The bits are shown as battery level 1, L1 and level 2, L2. As explained with relation to FIG. 21, the urgency bits transmitted to the sensor may not be reflected in an actual sleep pattern implemented by the sensor, because the suitable sleep pattern is not allowed due to battery level considerations. The battery bits sent to the coordinator may then need to be viewed in conjunction with the parameter level/urgency bits as an indication of the actual sleep pattern implemented, taking the battery level into account.

The above embodiments could be incorporated as an enhancement to IEEE 802.15.4 or as an integral part of a new standard under development requiring the proposed features such as IEEE 802.15.6, the standard for BAN.

This sleep pattern enhancement may be one of a number of linked enhancements. FIG. 25 shows the required modifications to IEEE 802.15.4 frame control fields to include the urgency bits and battery bits referred to herein, along with an emergency bit and two bits denoting an acknowledgement type. For backward compatibility, the reserved bits (7-9) of IEEE 802.15.4 are used for these emergency and acknowledgement types. In addition, the frame control has been extended by one octet of which two bits are used to distinguish various levels of urgency and an another two battery bits as used as explained hereinbefore. The remaining two bits of the octet are reserved. The corresponding IEEE 802.15.4 modified frame type is shown in FIG. 26. For backward compatibility, reserved bits 100-111 are used to indicate the different type of ACK frames and an emergency frame which is a new type of frame created for emergency situations.

Starting a standard from a "green field" approach, the enhancements would possibly include in the frame control the following:
  Two bits for ACK types
  Two bits for urgency levels
  Two bits for battery levels
  Three bits to indicate the type of frame Moreover the frame type in the control frame could include values to indicate any of the following in addition to other type frames such as data frame, MAC frame and Beacon frame:
  Emergency frame
  ACK frame
  Immediate ACK frame
  Delayed ACK frame FIG. 27 illustrates the enhancements as part of a new standard such as IEEE 802.15.6. The Figure illustrates the proposed part of the header frame at the MAC layer. The skilled reader will appreciate that the urgency levels and battery levels refer to the embodiments of the present application, which may be combined with any combination of the other enhancements to form further embodiments in a complete system. In one embodiment, an emergency bit (or other emergency indication) used in conjunction with urgency bits and optionally battery level bits (suitable sleep pattern indication and optionally battery charge information) can supplement and/or confirm emergency status. FIG. 28 shows a table corresponding to FIG. 27 of possible frame type bits.

FIG. 29 illustrates the basic format of a MAC frame in the current IEEE 802.15.4 standard indicating the location of the MAC Command octets. FIG. 30 illustrates the Command Frame Identifier list of the current version of IEEE 802.15.4 standard.

The frame control embodiments of the present invention described above use at least four bits (u1 u2 b1 b2) in the MAC frame control of the MAC frame header to specify the states of a BAN device. These state information bits can all be set independently and combined in multiple ways for BAN, BAN traffic, and BAN device management, generally in, but not limited to, emergency situations. They may be sent in a MAC command frame as shown in FIG. 29, or any other type of transmission frame.

In an alternative solution, a new MAC command frame can be added, with a new command frame identifier added to the list in FIG. 30. The payload could be used to differentiate between device states using the bits previously mentioned or in some other way.

A further alternative and preferable approach suitable for any transmission frame type including MAC command frames, is to introduce a single octet outside the frame control but still in the MAC Header with the bits previously mentioned, or preferably an enumerated list of device states as shown below. This octet will provide a total of 256 possible device states, for example, but not limited to:
State ID—Device State Description 0x01—Normal (i.e. no emergency, battery normal)
0x02—No emergency, battery medium
0x03—No emergency, battery low
0x04—Emergency, battery normal
0x05—Emergency, battery medium
0x06—Emergency, battery low In order for a receiving device to know whether or not to read and interpret this field, a single "Device State" (ds) bit can be introduced into the MAC Frame Control to indicate read and interpret device state (ds=1) or ignore device state (ds=0).

Reliability is one of major requirements of IEEE 802.15.6 and other standards. Under medical emergencies sometimes it is crucial to increase the frequency under which the patient life-saving or other crucial information is obtained by sensors. For example if under normal conditions the sensor measures the data on a 10-hour basis, in an emergency it might be necessary to do an update on patient conditions every half an hour. Embodiments of the invention disclose a novel coordinator-based centralized sleep/wake-up pattern scheduling that allows the coordinator in a medical BAN to harmonise the sleep patterns under emergency conditions considering the number of devices in emergency.

The invention embodiments consider the cases in which a central monitoring capability is available and the sleep pattern can be changed by a nurse from central care station analysing the patient situation or on an automatic basis based on an analysis or diagnosis performed in a central monitoring station. A particularly advantageous feature is creating centralised command capability to change the sleep pattern using medical staff analysing the situation considering multiple input parameters. This may also be done in a gateway or elsewhere by some intelligent pattern recognition algorithms Invention embodiments can have the following advantageous aspects:

They introduce methods for centralised wake-up and sleep pattern scheduling in a Medical Body Area Network or a Wireless Sensor Network in Response to an Emergency Situation.

They introduce methods for centralized and sleep pattern scheduling in a Medical Body Area Network or a Wireless Sensor Network in response to an emergency situation taking into account the battery status.

They provide methods for centralized sleep pattern scheduling in a Medical Body Area Network or a Wireless Sensor Network in Response to an emergency situation and in harmony with the central medical care unit.

Additionally, they provide methods for centralized sleep pattern scheduling in a Medical Body Area Network or a Wireless Sensor Network in response to an emergency situation and in harmony with the central medical care unit taking into account the battery status.

They introduce the concept of slowing down the non-medical devices and non-emergency medical devices when multiple patients or multiple sensors of a patient go under emergency.

Novel signalling bits (i.e. emergency bits) are provided to quantize the amount of slow-down in the wake-up pattern Embodiments of the present invention may have a vital role to play in facilitating emergency management by use of MBANs. The following scenarios may be noted:
1. Hundreds of millions of people worldwide suffer from diabetics. Implantable or non-invasive methods for glucose measurement have been considered recently. The WSN will help to provide patient's glucose level information on a 24 hours basis. There are situations where the patient glucose is off the chart and emergency geolocation and other necessary urgent medical procedures for the patients are required. The situation with hundreds of millions of patients worldwide with cardiac and heart problems can be monitored in hospital or at home by employing wireless sensors and MBAN on their bodies. The MBAN provide extra mobility for such patients. For this group of patients under situations such as abnormal heart functioning or more severe cases such as heart attack it is vital to make sure that no vital medical data is missed or delayed during life threatening medical emergencies. Invention embodiments create the potential for more accurate and centralised control and scheduling of sleep pattern of medical sensors or devices attached to patient that go under emergency.
2. Invention embodiments give the central medical care unit the potential to control the sleep pattern of devices in response to the diagnosed emergency.
3. The inventive concept of some embodiments of this emergency sleep-pattern scheduling has the potential to slow down other non-medical devices (or medical devices which are non-critical applications) when the number of patients or devices in emergency is above a critical threshold. By doing that it creates the potential for the coordinator and central medical care to deal with emergency patient and devices with more reliability and on an emergency-patient-first basis.
4. In doing that, invention embodiments can give consideration to the battery level to safeguard a reliable and stable emergency operation during an emergency.
5. Invention embodiments can save lives of thousand of patients who may go under emergency conditions when medical staff are not around.
6. Invention embodiments improve the efficiency of emergency response in a medical system.
7. Invention embodiments improve the emergency awareness in a medical MBAN system.
8. Invention embodiments reduce the labor costs by automating the emergency response process.
9. Invention embodiments improve the accuracy of emergency data obtained from patient body.
10. By harmonizing the sensor and coordinator, invention embodiments make it possible to achieve the best sleep pattern considering the severity of emergency and current battery level.

The present invention may take the form of a novel sensor, coordinator, central monitoring unit, or hardware modules for the same, and can be implemented by replacing or modifying software executed by processors of the sensor(s) and/or the coordinator and/or central monitoring unit.

Thus, embodiments of the present invention may be implemented in hardware, or as software modules running on one or more processors, or on a combination thereof. The invention may also be embodied as one or more device or apparatus programs (e.g. computer programs and computer program products) for carrying out part or all of any of the techniques described herein. Such programs embodying the present invention may be stored on computer-readable media, or could, for example, be in the form of one or more signals. Such signals may be data signals downloadable from an Internet website, or provided on a carrier signal, or in any other form.

Although the above description has referred to IEEE 802.15.4 and IEEE 802.15.6 by way of example, the invention may be applied to any type of MBAN whether or not operating in accordance with IEEE 802.15.6, as well as to other types of BAN and other short-range WSNs which even if not medical body area networks nevertheless have a requirement for improved reliability of communication in emergency situations.

The invention claimed is:

1. A wireless medical sensor network of devices including at least one duty-cycling medical sensor, at least one other non-medical duty-cycling device and a coordinator device, the at least one duty-cycling medical sensor comprising:
 sensing means operable to detect values of a life parameter of a patient;
 transmission and reception means for wireless communication with other devices in the network; and
 sensor control means operable to control a sleep pattern of the sensor; and
 the coordinator device comprising transmission and reception means for wireless communication with other devices in the network;
 wherein a plurality of predefined sleep patterns is provided, the choice of a suitable sleep pattern being determined according to a number of life parameter value thresholds, each threshold defining a boundary between a lower wake-up and a higher wake-up sleep pattern; wherein the sensor transmission means is operable to transmit value information as to the life parameter and the coordinator device transmission means is operable to transmit an indication of a suitable sensor sleep pattern determined centrally by comparing the transmitted value information with the thresholds for the life parameter; and
 wherein the coordinator device is operable to transmit suitable sleep patterns for each of the duty-cycling devices, a suitable sleep pattern transmitted to at least one non-medical duty-cycling device additionally taking into account at least one external factor not related to that non-medical duty-cycling device, in the form of the number of the medical sensor devices in the network in a predefined emergency state.

2. A network according to claim 1, wherein one such external factor is based on the value information.

3. A network according to claim 1, wherein each duty-cycling device has a priority, which determines to what extent, if at all, the coordinator device takes any external factors into account to determine its suitable sleep pattern.

4. A network according to claim 1, wherein the coordinator device further comprises determining means operable to determine the suitable sleep pattern or wherein the coordinator device reception means is operable to receive the suitable sleep pattern from a central monitoring unit, which is in wired or wireless communication with the coordinator device.

5. A network according to claim 1, wherein the coordinator device transmission means is operable to transmit the indication in at least one control field of a transmission frame, preferably using a value set in the MAC header, such as in the frame control field to a predetermined value.

6. A network according to claim 1, wherein the sensor further comprises a battery and wherein the sensor control means is operable to control the sleep pattern taking into account both the indication and a current battery charge.

7. A network according to claim 6, wherein the sensor control means allows or rejects suitable sleep patterns according to at least one predefined limit of acceptable battery charge, and preferably overrides any rejected suitable sleep pattern with a lower wake-up sleep pattern.

8. A network according to claim 6, wherein the sensor transmission means is operable to transmit battery charge information relating to the battery charge, preferably in a control field of a
   transmission frame in the form of a value set in the MAC header, such as the frame control field to a predetermined value.

9. A network according to claim 8, wherein the coordinator device reception means is operable to receive the battery charge information and wherein the coordinator device comprises response means operable to respond to a predefined value of charge information by taking action with respect to the battery.

10. A network according to claim 1, wherein the thresholds include a first threshold defining a boundary between a non-medical device and a medical device in a normal situation, a second threshold defining a boundary between a normal and a slightly abnormal situation and a third threshold defining a boundary between a slightly abnormal and an emergency situation.

11. A coordinator device in a wireless medical sensor network of devices including at least one duty-cycling medical sensor, at least one other non-medical duty-cycling device and the coordinator device, the coordinator device comprising:
   reception means operable to receive value information from the at least one sensor as to the detected values of a life parameter of a patient;
   determining means operable to determine a suitable sleep pattern for the sensor by comparing the received value information with thresholds for the life parameter;
   wherein a plurality of predefined sleep patterns is provided, the choice of a suitable sleep pattern being determined according to a number of life parameter value thresholds, each threshold defining a boundary between a lower wake-up and a higher wake-up sleep pattern; and
   transmission means operable to transmit an indication of the suitable sleep pattern;
   wherein the coordinator device is operable to transmit suitable sleep patterns for each of the duty-cycling devices, a suitable sleep pattern transmitted to at least one non-medical duty-cycling device additionally taking into account at least one external factor not related to that non-medical duty-cycling device, in the form of the number of the medical sensor devices in the network in a predefined emergency state.

12. A duty-cycling medical sensor in a wireless medical sensor network of devices including at least one duty-cycling medical sensor, at least one other non-medical duty-cycling device and a coordinator device, the sensor comprising:
   sensing means operable to detect values of a life parameter of a patient;
   sensor control means operable to control a sleep pattern of the sensor;
   transmission means operable to transmit value information as to the life parameter; and
   reception means operable to receive an indication of a suitable sensor sleep pattern determined centrally by comparing the transmitted value information with thresholds for the life parameter;
   wherein
   a plurality of predefined sleep patterns is provided, the choice of a suitable sleep pattern being determined according to a number of life parameter value thresholds, each threshold defining a boundary between a lower wake-up and a higher wake-up sleep pattern, with a first threshold defining a boundary between a non-medical device and a medical device in a normal situation, a second threshold defining a boundary between a normal and a slightly abnormal situation and a third threshold defining a boundary between a slightly abnormal and an emergency situation; and
   the sensor control means control the sleep pattern of the sensor taking the suitable sensor sleep pattern into account.

13. A central monitoring unit, which is in wired or wireless communication with a wireless medical sensor network of devices including at least one duty-cycling medical sensor, at least one other non-medical duty-cycling device and a coordinator device, the central monitoring unit comprising:
   determining means operable to determine a suitable sleep pattern for the sensor by comparing value information as to at least one life parameter of at least one patient, the value information transmitted by the sensor, with thresholds for the at least one life parameter; and
   communication means operable to send an indication of the suitable sleep pattern to a device of the network;
   wherein a plurality of predefined sleep patterns is provided, the choice of a suitable sleep pattern being determined according to a number of life parameter value thresholds, each threshold defining a boundary between a lower wake-up and a higher wake-up sleep pattern; and
   wherein the central monitoring unit is operable to determine suitable sleep patterns for the at least one non-medical duty-cycling device additionally taking into account at least one external factor not related to that non-medical duty-cycling device, in the form of the number of the medical sensor devices in the network in a predefined emergency state.

14. A method in a wireless medical sensor network of devices including at least one duty-cycling medical sensor, at least one other non-medical duty-cycling device and a coordinator device, the method comprising:
   detecting values of a life parameter of a patient in the sensor;

transmitting value information as to the life parameter from the sensor towards the coordinator device; and transmitting an indication of a suitable sensor sleep pattern determined centrally by comparing the transmitted value information with thresholds for the life parameter from the coordinator device towards the sensor and controlling a sleep pattern of the sensor taking into account the indication;

wherein a plurality of predefined sleep patterns is provided, the choice of a suitable sleep pattern being determined according to life parameter value thresholds, each threshold defining a boundary between a lower wake-up and a higher wake-up sleep pattern, with a first threshold defining a boundary between a non-medical device and a medical device in a normal situation, a second threshold defining a boundary between a normal and a slightly abnormal situation and a third threshold defining a boundary between a slightly abnormal and an emergency situational.

\* \* \* \* \*